United States Patent
Maki et al.

(10) Patent No.: US 6,507,622 B2
(45) Date of Patent: Jan. 14, 2003

(54) COMMUNICATION SYSTEMS, SENDER AND RECEIVER

(75) Inventors: Masahiro Maki, Iizuka (JP); Shoichi Koga, Fukuoka-ken (JP); Satoshi Shinozaki, Kukuoka-ken (JP); Yuji Igata, Tsukushino (JP); Satoshi Hasako, Iizuka (JP); Michinori Kishimoto, Iizuka (JP); Kazuhiko Tamesue, Fukuoka-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/159,386

(22) Filed: Sep. 23, 1998

(65) Prior Publication Data

US 2002/0136314 A1 Sep. 26, 2002

(30) Foreign Application Priority Data

Sep. 29, 1997 (JP) .............................................. 9-264135
Jan. 29, 1998 (JP) ............................................ 10-016969

(51) Int. Cl.[7] .............................................. H04L 1/02
(52) U.S. Cl. ....................... 375/267; 375/285; 375/296; 375/299; 375/347; 375/349; 370/281; 370/319; 370/343; 370/480; 455/104; 455/226.2; 455/226.3
(58) Field of Search ......................... 375/260, 264–267, 375/285, 286, 287, 288, 295, 296, 299, 347, 349; 370/281, 295, 319, 343, 480; 455/101, 104, 115, 226.2, 226.3, 269

(56) References Cited

U.S. PATENT DOCUMENTS

| | | | | |
|---|---|---|---|---|
| 5,283,780 A | * | 2/1994 | Schuchman et al. | 370/312 |
| 5,504,783 A | * | 4/1996 | Tomisato et al. | 370/482 |
| 5,682,376 A | * | 10/1997 | Hayashino et al. | 370/206 |
| 5,790,550 A | * | 8/1998 | Peeters et al. | 370/480 |
| 6,005,893 A | * | 12/1999 | Hyll | 375/260 |
| 6,044,106 A | * | 3/2000 | Suzuki | 375/219 |
| 6,198,778 B1 | * | 3/2001 | Mestdagh | 375/296 |
| 6,215,777 B1 | * | 4/2001 | Chen et al. | 370/335 |
| 6,246,725 B1 | * | 6/2001 | Vanzieleghem et al. | 375/295 |
| 6,308,054 B2 | * | 10/2001 | Ogino et al. | 455/134 |
| 6,415,005 B2 | * | 7/2002 | Koga et al. | 375/219 |

OTHER PUBLICATIONS

The Communications Handbook by Jerry D. Gibson, 1996, p. 216.*

"Overlapped Discrete Multitone Modulation for High Speed Copper Wire Communications", Stuart D. Sandberg and Michael A. Tzannes. IEEE Journal of Selected Areas in Communications, vol. 13, No. 9, Dec. 1995.

* cited by examiner

Primary Examiner—Stephen Chin
Assistant Examiner—Dac V. Ha
(74) Attorney, Agent, or Firm—McDermott, Will & Emery

(57) ABSTRACT

To use high noise transmission lines, such as an electric wire, as the lines to transmit signals, it is imperative to reduce the level of signals. The present invention is provided with a sending signal generating means 10, which outputs converted data after converting an input signal into a plurality of carrier signals assuming values at such intervals on the axis of frequency that the frequencies may not interfere with each other. If an interfering noise with any one of the plurality of frequencies arises on the transmission line, removal of only a carrier of the noise frequency would leave the communication in a good condition. Furthermore, better results can be hoped for if the respective carrier signals are so arranged as not to interfere with each other or so arranged to intersect orthogonally with each other not only on the axis of frequency but also on the axis of time 42 Claims, 15 Drawing Sheets FIG. 10(a) spectrum wave form of first modulated data FIG. 10(b) spectrum wave form of second modulated data

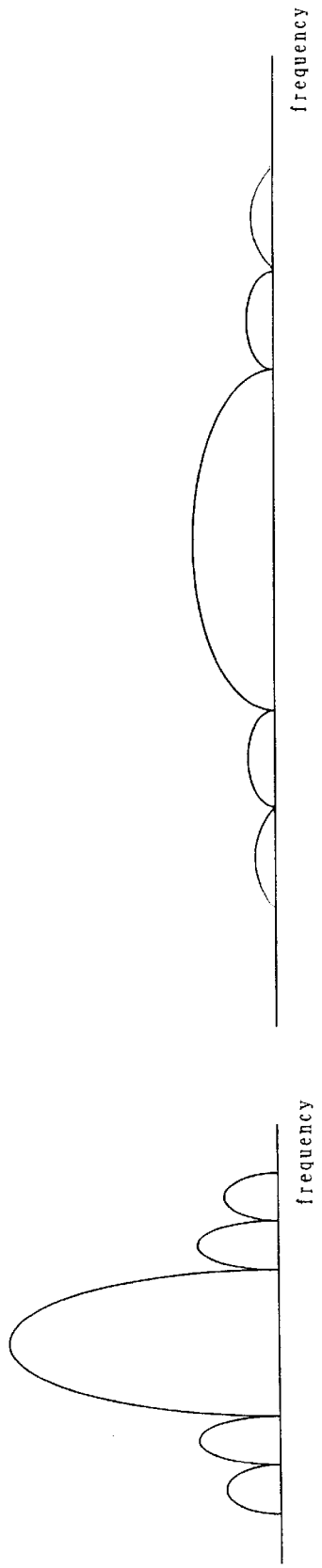
FIG. 16(a)
FIG. 16(c)
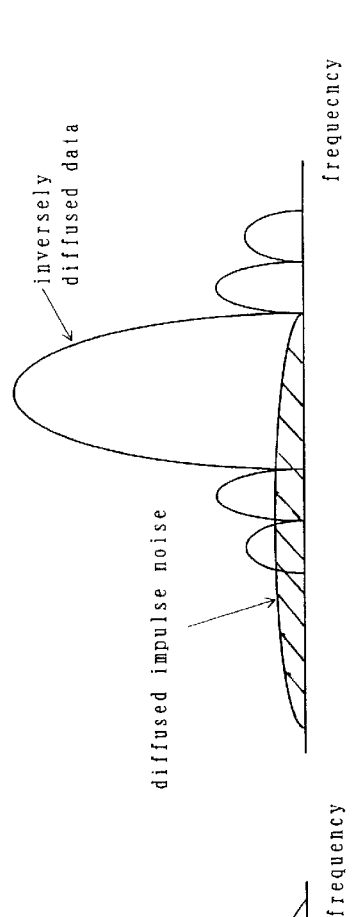
FIG. 16(b)
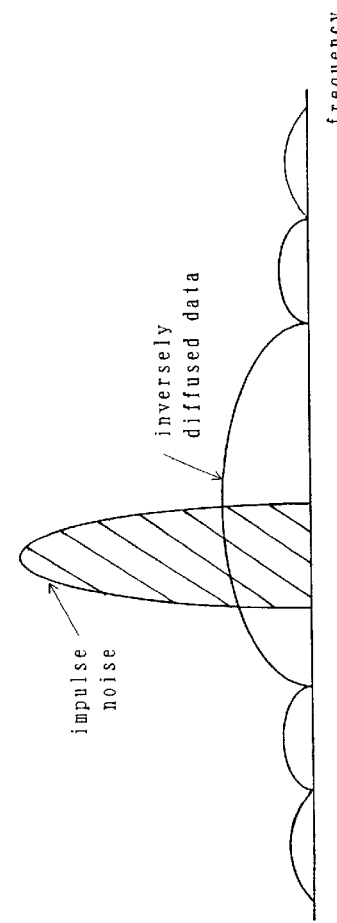
FIG. 16(d)

COMMUNICATION SYSTEMS, SENDER AND RECEIVER

FIELD OF THE INVENTION

The present invention relates to a communication system and more particularly to a communication system via high noise transmission lines of low-voltage power such as an electric wire and its sender and receiver.

BACKGROUND OF THE INVENTION

Such narrow-band noises as distortion and impulse noise in transmission lines are often too great to overlook in the transmission systems. In such transmission systems a diffusion data transmission technique has been used as useful means to combat those noises in the past. The diffusion data transmission technique comprises the sender which diffuses data to send via a transmission line and the receiver which inversely diffuses data received The data transmission system based on that conventional diffusion data transmission is described by the following example of the data transmission system using the existing electric power line, that is, low-tension power line of a 100-volt a. c., 50/60 Hz.

FIG. 15 is a block diagram showing an example of the conventional system of the direct diffusion technique for sending data via the electric power line.

In FIG. 15, a sender 100 and a receiver 200 are connected to each other via a transmission line 300.

The sender 100 is provided with a mixer 110, a pseudo noise generator 111, a carrier wave oscillator 112 and an equilibrium modulator 113. The receiver 200 includes a mixer 210, a pseudo noise generator 211, a carrier wave oscillator 212, an equilibrium modulator 213 and an intermediate frequency band pass filter (IF-BPF) 214.

Diffusion signals from the pseudo noise oscillator 211 is inputted in the mixer 110 on the sender side as well as input data are inputted in the same Those two kinds of signals are multiplied and inputted in the next equilibrium modulator 113 The aforesaid carrier wave oscillator 112 generates and inputs a carrier wave in the equilibrium modulator 113. The equilibrium modulator 113 then modulates the carrier wave with the signal from the mixer 110 (diffused input signal) and sends out the modulated carrier wave without the original carrier wave to the receiver 200.

In the receiver 200, the carrier wave oscillator 212 generates a carrier wave with the same frequency as of the carrier wave generated by the carrier wave oscillator 112 on the side of the sender 100, and inputs it in the equilibrium modulator 213. Meantime, the pseudo noise generator 211 produces an inversely diffused code with a phase opposite to the diffused code generated by the sender 100, and inputs it in the equilibrium modulator 213. Thereby, the equilibrium modulator 213 modulates the carrier wave outputted from the carrier wave oscillator 212 by using an inversely diffused code outputted by the pseudo noise generator 211. The modulated carrier wave is then outputted to the mixer 210. The mixer 210 multiplies a modulated signal inputted via the transmission line 300 and a modulated signal inputted from the equilibrium modulator 213, and then outputs its result to IF-BPF 214. IF-BPF 214, which means an intermediate frequency band pass filter, is a filter through which waves in the intermediate frequency band can pass.

Now, supposing that the data signal inputted to the mixer 110 carries a spectrum as shown in FIG. 16(a), the mixer 110 diffuses the spectrum by multiplying the input data signal using the diffused code provided by the pseudo noise generator 111. A spectrum waveform of an input data signal after the diffusion is shown in FIG. 16(b). The diffused data signal then modulates a carrier wave outputted from the carrier wave oscillator 112 at the equilibrium modulator 112 and outputs the modulated signal onto the transmission line 300. The phrase diffused code means a code with multiple bits in relation to "1" or "0" as, for example, a 31-bit code like 1111100011011110101000010010110 or 00000111001000101011101010011.

The following is described in the case that an impulse noise (shaded area indicated in FIG. 16(c)) occurs while data signals are being sent via the transmission line 300 and the receiver 200 is to receive the signals shown in FIG. 16(c).

As mentioned, the carrier wave outputted by the carrier wave oscillator 212 in the receiver 200 is modulated with the inversely diffused code given by the pseudo noise generator 211 at the equilibrium modulator 213 Furthermore, the mixer 210 diffuses the spectrum by multiplying the modulated signal and the diffused data signal obtained via the transmission line 300. The inversely diffused code is a code that the total bits of the diffused code is "1" against the inputting of "1" if the absolute OR with the diffused code is taken (reversely, the inputting "0" brings the total bits of the diffused code to "0"), that is, the inversely diffused code is a code that the diffused code is turned round.

In the multiplication performed at the mixer 210, the data signals diffused at the sender 100 will be inversely diffused but will undergo usual diffusion against the impulse noise. Therefore, the spectrum waveform of data signals after the multiplication (that is, an inverse diffusion) is as shown in FIG. 16(d). That is, the data signals are recovered to the original form while the impulse signals generated in transmission are diffused instead so that the level for the data signals gets small immediately. This way, the effect of the impulse signals upon the data signals is alleviated Needless to say, however, in order to carry out the aforesaid inverse diffusion exactly, it is necessary to exactly synchronize the inputting in the mixer 210 of signals from the transmission line and the inputting of modulated signals from the equilibrium modulator 213.

As set forth above, the conventional system of sending data by direct diffusion technique alleviates the effects of narrow band noises such as impulse noise as well as distortion on the transmission line caused by equipment connected to the line, (for example, the line noise occurring at the start-up of the compressor in the household refrigerator connected to the low-tension electric power line through the 100 V outlet in the house), by the processing of diffusing and inversely diffusing the spectrum as indicated in FIGS. 16(c) and 16(d).

The technique of diffusing spectrum is described in a book entitled "Spectrum Diffusion Communication Formula" published by Jatech Publishing Co., pages 9 to 28.

The prior art system of sending data by the direct diffusion technique as just outlined is effective in removing the effects of narrow-band noises and line distortion to some extent. But in the prior art, it is impossible to completely get rid of the effects of narrow-band noises and line distortion over the full band of frequencies as in the low-tension power line. That is, in case the line noise or distortion is too strong over the level of input data signals, the conventional diffusion technique is no longer effective enough to reduce those noises or distortion.

And, since the frequencies of the aforesaid diffused code are spread over a wide band the bandwidth occupied by the modulated signals increases. Accordingly a large number of side lobes rises over a wide band as well as a main lobe, and those side lobes consume much energy and keeps down the transmission efficiency As mentioned furthermore, the inverse diffusion requires the synchronizing of signals obtained from the transmission line and signals from the equilibrium modulator. This synchronizing undergoes complicated procedures and costs much when it is carried out through a fairly complicated circuit or program In addition the prior art is not sufficient in synchronizing accuracy and can fail to detect data.

SUMMARY OF THE INVENTION

It is an object of the present invention to provide a communication system for transmitting data at a high speed with the data quality kept high by making good use of frequency bands which are free from the effects of narrow band noises or line distortion. It is another object of the present invention to provide a communication system which can improve transmission efficiency and accuracy through the use of a plurality of carriers with the frequencies assuming values at specific intervals.

To achieve the foregoing objects, the present invention adopts a number of means described below. And it is prerequisite that the present invention adopts a communication system in which a sender 1 and a receiver 2 are connected to each other via the transmission line. That communication system is the basis on which the present invention is built.

First, according to the above prerequisite arrangement, the basis communication system is provided with a sending signal generating means 10 as at, shown in FIG. 1 and FIG. 6. The sending signal generating means 10 output converted data after converting an input signal into a plurality of carrier signals assuming values at such intervals on the axis of frequency that the frequencies may not interfere with each other. If an interfering noise with any one of the plurality of frequencies arises on the transmission line, removal of only a carrier of the noise frequency would leave the communication in a good condition.

The sending signal generating means 10 is formed of a carrier signal generating means 12 for generating signals with frequencies assuming values at specific intervals, and a multiplication means 11 for sending out the input signals on the transmission line after multiplying them by the respective carrier signals and then.

A transmission line characteristics measuring means 20 is provided on the receiver 2 to find the characteristics on the transmission line, and on the basis of the results from the transmission line characteristics measuring means 20, a selection control means 40 provided to the sender 1 or the receiver 2 judges whether a noise arises on the transmission line or not.

The selection control means 40 incorporates the results in the sending signals from the sender 1 or in the receiving signals to be inputted in the receiver 2 via the transmission line.

In other words, the selection control means 40 controls the generation of carrier signals at a carrier signal generating means 12 in the sender 1, as shown in FIG. 6 and FIG. 8 so that the selection control means 40 does not send out carrier signals with poor characteristics on the transmission line. Or decreases the ratio of carrier signals with poor characteristics on the transmission lines. Or the selection control means 40 does not pick out and commit to synthesis the carrier signals with poor transmission line characteristics in forming the signals to be received by the receiver 2 as illustrated in FIG. 1. Or the means 40 reduces the percentage in the synthesis of the carrier signals with poor transmission lines characteristics.

The transmission line characteristics measuring means 20 determines line characteristics on the basis of the absolute value of the intensity of receiving signals as shown in FIG. 3 and FIG. 7 or on the basis of the phase difference from the reference phase and inputs the results in the selection control means 40.

Still better results can be hoped for if the respective carrier signals are so arranged as not to interfere with each other or so arranged to intersect orthogonally with each other not only on the axis of frequency but also on the axis of time as shown in FIG. 13 and FIG. 14.

That is to say, it is so arranged that the sender 1 generates carrier signals by passing the input signals through a plurality of filters 52 which satisfy the orthogonal requirements both on the axis of frequency and the axis of time (double orthogonalization). On the other hand the receiver 2 uses a plurality of filters 62 which form only the same but time-delayed with sending signals. That can form signals with a band narrow not only on the axis of frequency but also on the axis of time—the sending signals largely not subject to the effects of noises arising on the transmission line.

In that case, it is also desirable to eliminate or reduce the mixing ratio of the carriers which flow through the transmission lines with poor characteristics.

For a plurality of types of input signals, it is, in principle, necessary to provide a plurality of sets of the sending signal generating means 10. In case the aforementioned double orthogonalization is used, it is desirable that the encoder should have a function of allocating the filters, for example, filters a to c for input A and filter d to f for input B, since an encoder is used to divide the input signals in the number corresponding to a plurality of filter.

BRIEF DESCRIPTION OF THE DRAWINGS

FIG. 16 shows examples of spectrum waveforms in the prior art sender and receiver.

DESCRIPTION OF THE PREFERRED EMBODIMENTS

Now, the embodiments of the present invention are described with reference to the drawings FIGS. 1 to 14.

EMBODIMENT 1

Figure 1:
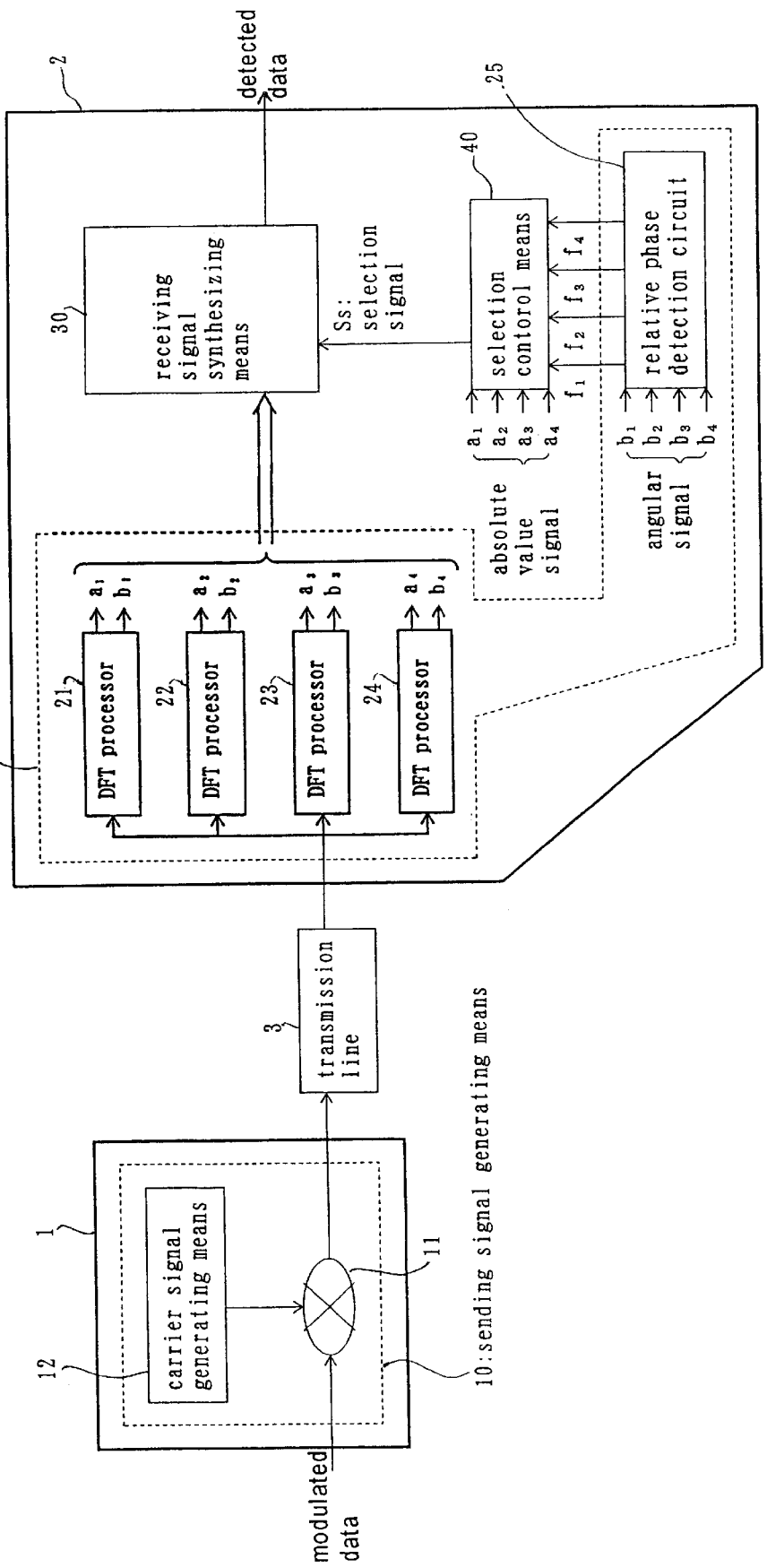
FIG. 1 is a block diagram showing the configuration of a communication system in a first embodiment of the present invention.

FIG. 1 is a block diagram showing the configuration of a communication system in a first embodiment of the present invention.

In FIG. 1, the communication system in a first embodiment of the present invention has a sender 1 and a receiver 2 connected with each other via a transmission line 3.

The sender 1 is provided with a sending signal generating means 10 comprising a multiplier 11 and a carrier signal generator 12. The receiver 2 comprises 4 discrete Fourier transformation (DFT) processors 21 to 24 making up a transmission line characteristics measuring means 20, a relative phase detection circuit 25, a selection control means 40 for deciding on the mixing ratio of carrier signals at a receiving signal synthesizing means 30 on the basis of measurement results from the transmission line characteristics measuring means 20, and the receiving signal synthesizing means 30.

In the sender 1, the carrier signal generator 12 generates a plurality of carrier signals with frequencies assuming values at specific intervals and inputs those carrier signals into the multiplier 11. The multiplier 11 multiplies the modulated data, that is, the input data modulated by a modulator (not shown), by the plurality of carrier signals given by the carrier signal generator 12. Those carrier signals are then sent out to the receiver 2 via the transmission line 3.

The carrier signals sent in via the transmission line 3 are then inputted into the four DFT processors in the receiver 2 respectively. Those four DFT processors 21 to 24 have their respective signal zones allocated for the processing of signals. The Fourier transformation of signals in the respective signal zones detects absolute value signals $a_1$ to $a_4$ and angular signals $b_1$ to $b_4$ which will be described later. The respective absolute value signals $a_1$ to $a_4$ detected by the DFT processors 21 to 24 are inputted into the selection control means 40 while the respective angular signals $b_1$ to $b_4$ are inputted into the relative phase detection circuit 25.

The relative phase detection circuit 25 detects relative phases from the angular signals $b_1$ to $b_4$ and the reference signals and outputs the detected relative phases as relative phase signals $f_1$ to $f_4$ to the selection control means 40. The reference signals may be either ones determined in advance or ones given by the sender 1.

The selection control means 40 decides which of the carrier signals to select on the basis of the absolute value signals $a_1$ to $a_4$ inputted by the DFT processors 21 to 24 and the relative phase signals $f_1$ to $f_4$ inputted by the relative phase detection circuit 25 and outputs that selection signal Ss in the next stage, the receiving signal synthesizing means 30. According to the selection signal Ss, the receiving signal synthesizing mans 30 synthesizes the selected signals using either the absolute value signals $a_1$ to $a_4$ or the angular signals $b_1$ to $b_4$ or both. The receive data thus synthesized is demodulated by a demodulator (not shows to produce a final output data. The type of signals required for the receiving signal synthesizing is decided on according to the modulation formula and other conditions.

Figure 2A:
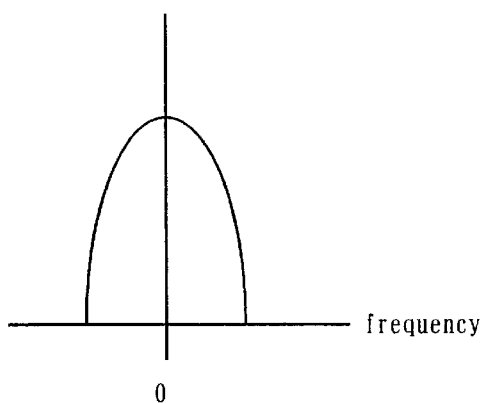
FIG. 2 shows examples of spectrum waveforms of the transfer functions and data of carrier signals in the receiver in FIG. 1.

The present embodiment is further explained by taking the following case that the modulated data (input signals) inputted into the multiplier 11 in the sender 1 is subjected to phase shift keying (PSK) modulation. It is understood that the spectrum waveform of the modulated data is shown in FIG. 2(a). It is also understood that the carrier signal generator 12 outputs carrier signals for an impulse response of a transfer function $H(\omega)$ given by the following equation (1) and that the impulse waveform of the transfer function $H(\omega)$ is as one shown in FIG. 2(b).

$$H(\omega) = \sum_{k=0}^{3} \delta(\omega - \omega_0 - k\omega_c) \qquad (1)$$
$$= \delta(\omega - \omega_0) + \delta(\omega - \omega_0 - \omega_c) + \delta(\omega - \omega_0 - 2\omega_c) +$$
$$\delta(\omega - \omega_0 - 3\omega_c)$$

Figure 2B:
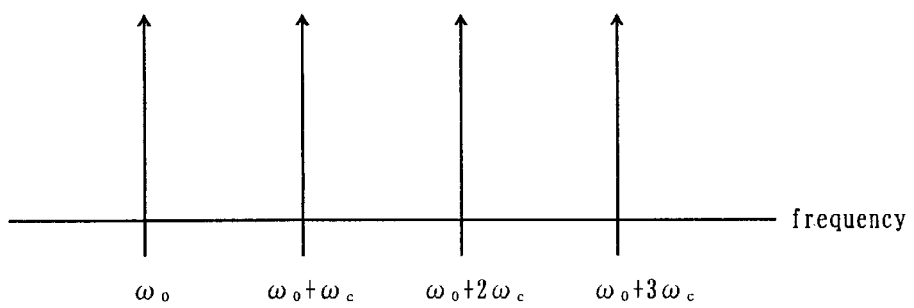
Figure 2C:
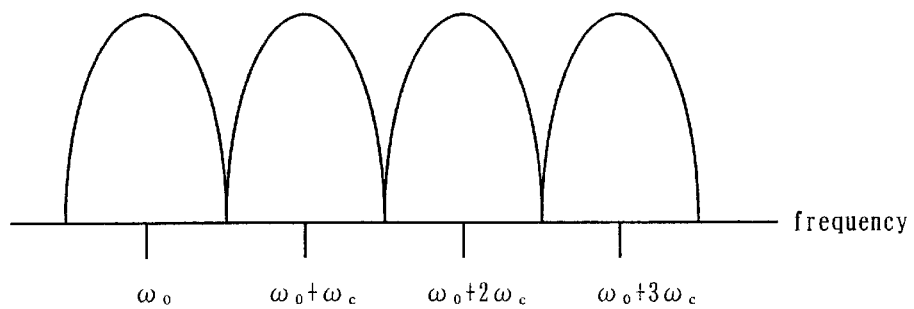

As indicated in the equation (1), the carrier signals outputted from the carrier signal generator 12 are made up of frequencies of four different values at an equal interval ($\omega_c$), that is, frequencies of $\omega_o$, $\omega_o+\omega_c$, $\omega_o+2\omega_c$, and $\omega_o+3\omega_c$. If modulated signals and a plurality of carrier signals are inputted into the multiplier 11, as shown in FIG. 2(c), the multiplier 11 outputs sending signals of each frequency having a spectrum waveform in FIG. 2(a), with the respective carrier signals in FIG. 2(b) as carrier.

Data with four carrier signals is taken up for description of the present embodiment. The number of carrier signals is not limited to that, but any number may be selected as necessary.

In the receiver 2 the DFT processors 21 to 24 process the respective carrier signals, that is, pick out absolute value signals $a_1$ to $a_4$ and angular signals $b_1$ to $b_4$ from the sending signals. Here, the DFT processor 21 processes the carrier signal with a frequency of $\omega_o$; the DFT processor 22, the carrier signal with a frequency of $\omega_o+\omega_c$; the DFT processor 23, the carrier signal with a frequency of $\omega_o+2\omega_c$; and the DFT processor 24, the carrier signal with a frequency of $\omega_o+3\omega_c$. Needless to say, the number of carriers have to tally with that of DFT processors.

The angular signals $b_1$ to $b_4$ detected by the respective DFT processors 21 to 24 are inputted into the relative phase detection circuit 25. The relative phase detection circuit 25 in turn detects relative phases for the input angular signals $b_1$ to $b_4$ in relation to the reference phases in the respective carrier signals. The relative phases can be found these ways:

In case PSK-modulated signals are sent as in this first embodiment, the reference phase is set in advance so that the phase difference between the angle of carrier signal and the reference phase may be found out. In another case where modulated signals by differential phase shift keying (DPSK) modulation formula are sent, the phase difference between the current signal and the one just before that is found.

Absolute value signals $a_1$ to $a_4$ of the respective carrier signals detected at the DFT processors 21 to 24 and the relative phase signals $f_1$ to $f_4$ outputted from the relative phase detection circuit 25 are inputted into the selection control means 40. The selection control means 40 then estimates the transmission line characteristics on the basis of the intensity of input absolute signals $a_1$ to $a_4$ and the values of relative phase signals $f_1$ to $f_4$ in the way described below and then forms and outputs a suitable selection signal Ss to the receiving signal synthesizing means 30. The receiving signal synthesizing means 30 synthesizes the selected signals on the basis of the contents of the selection signal Ss.

Figure 3A:
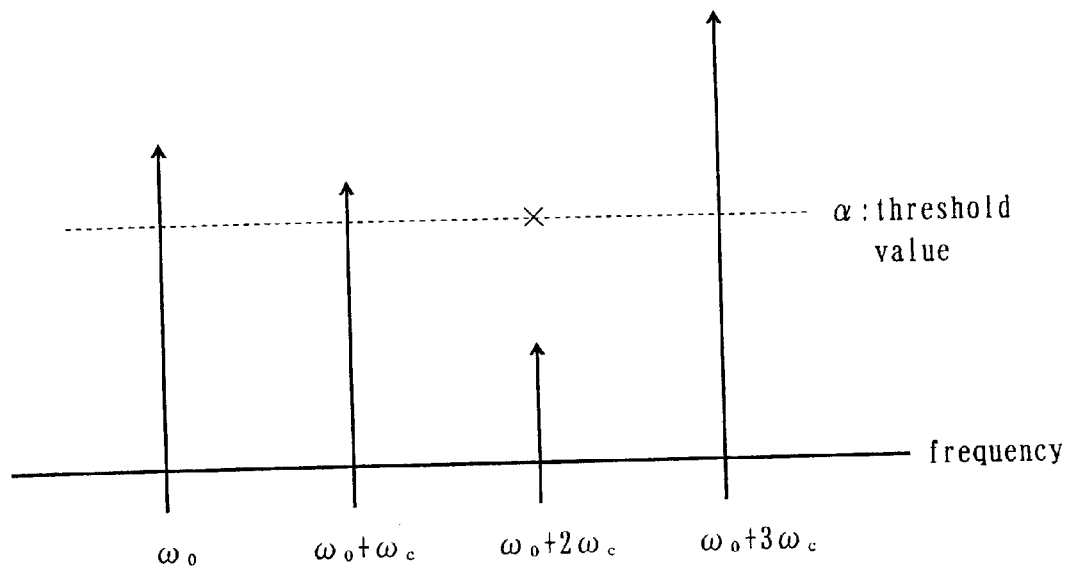
FIG. 3 shows a typical selection with absolute value signals of carrier signals which is carried out by a receiving signal synthesizing means in FIG. 1.
Figure 3B:
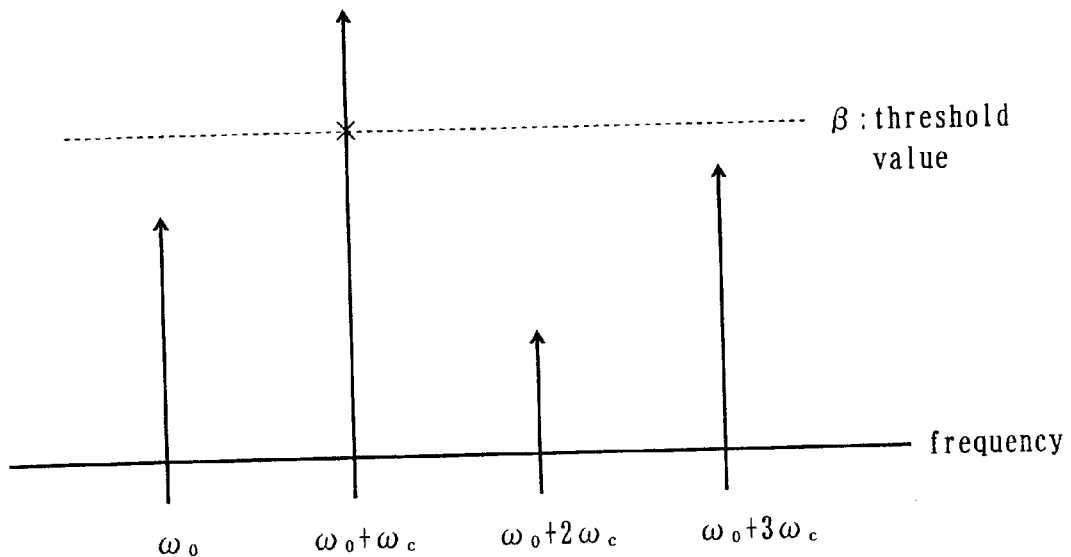
Figure 4:
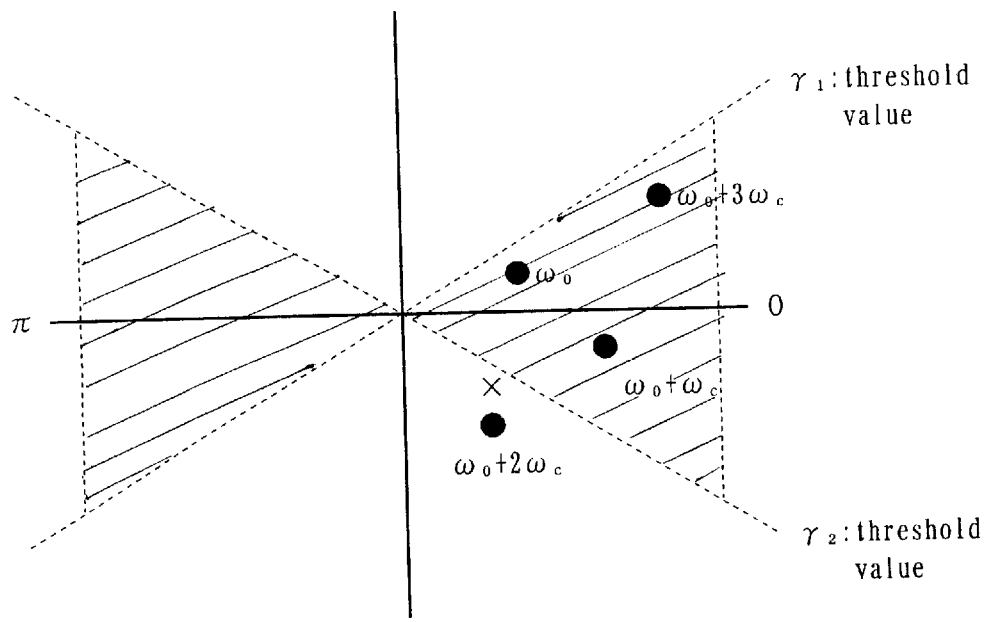
FIG. 4 shows a typical selection with relative phase signals of carrier signals which takes place in the selection synthesizing circuit in FIG. 1.
Figure 5:
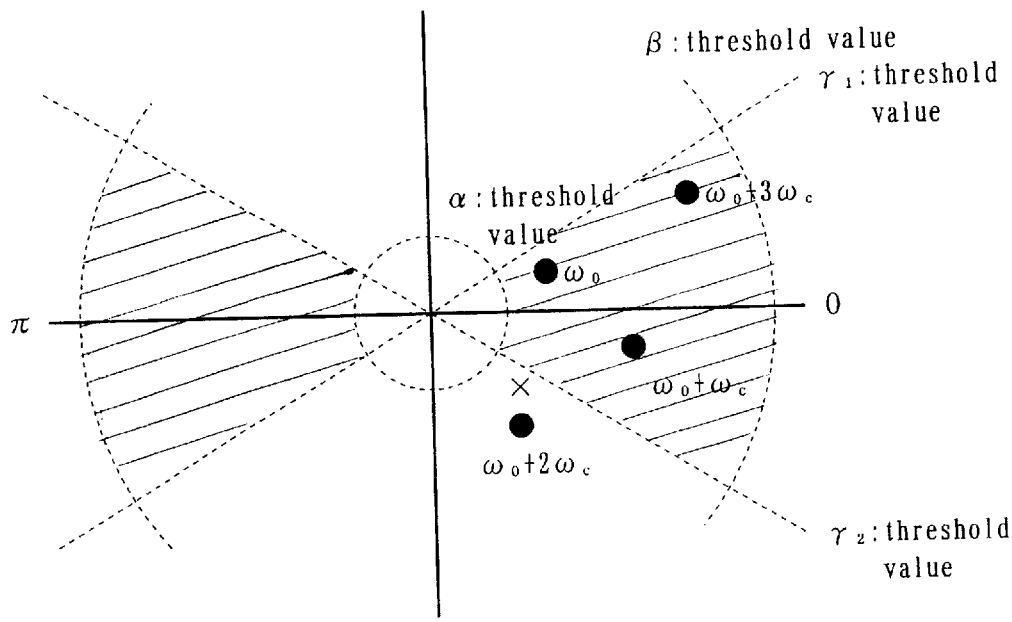
FIG. 5 shows a typical selection of carrier signals with both absolute value signals and relative phase signals which takes place in the selection synthesizing circuit in FIG. 1.

Referring to FIGS. 3 to 5, there is explained as follows how the line characteristics are determined at the selection control means 40.

There are three determination methods: the first that absolute value signals $a_1$ to $a_4$ are to be parameters (FIG. 3); the second that relative phase signals $f_1$ to $f_4$ are to be as parameters (FIG. 4); and the third that both absolute value signals $a_1$ to $a_4$ and relative phase signals $f_1$ to $f_4$ are to be as parameter (FIG. 5).

In the first method using absolute value signals $a_1$ to $a_4$ as parameters, it is judged whether there is any distortion in the intensity levels of the absolute value signals $a_1$ to $a_4$. For the judgment, a threshold value is set at specific intensity level in advance and it is checked if the absolute value signals $a_1$ to $a_4$ are over that threshold value.

If, for example, sending signals are distorted on the transmission line 3 and the absolute value signals $a_1$ to $a_4$ of the respective carrier signals detected at the DFT processors 21 to 24 are each attenuated in intensity as shown in FIG. 3(*a*), the signals with the intensity level exceeding the preset threshold value α can be regarded as free from the effect of line distortion. In FIG. 3(*a*), therefore the carrier signal with a frequency of $\omega_o+2\omega_c$ which is under the threshold value α is eliminated while the other carrier signals with frequencies of $\omega_o$, $\omega_o+\omega_c$ and $\omega_o+3\omega_c$ are selected out at the selection control means 40. Those three carrier signals are then synthesized and outputted as detected data.

In the transmission line characteristics that any of carrier signals rises in the intensity level of absolute value because of the narrow band noise as shown in FIG. 3(*b*), on the other hand it can be concluded that the carrier signals in lower intensity than the threshold value β are not affected by the narrow band noise. In other words, the true signals received by the receiver 2 can not get higher than those sent out from the sender 1 in intensity, and the signals exceeding that threshold value β must contain some noises. Therefore, the selection control means 40 eliminates the carrier signal with a frequency of $\omega_o+\omega_c$ which exceeds the threshold value β but takes out the carrier signals with frequencies $\omega_o$, $\omega_o+2\omega_c$, and $\omega_o+3\omega_c$, those carrier signals are then synthesized and outputted as detected data by the receiving signal synthesizing means 30.

If a specific value is set as lower threshold value α as in FIG. 3(*a*) and another specific value as upper threshold value β as shown in FIG. 3(*b*), the aforesaid two cases can be coped with.

In the methods using the absolute value signals $a_1$ to $a_4$ as parameter which were described above, the selected carrier signals were equally mixed in the synthesizing process. The mixing ratio of individual components may be varied depending on the intensity of signal. The mixing ratio of frequencies of $\omega_o:\omega_o+\omega_c:\omega_o+3\omega_c$, for example, is to be set at 2:1:3 in FIG. 3(*a*) so that it could produce receiving signals with a high reliability depending on the line characteristics. A threshold value does not necessarily have to be set. Instead, all the receiving signals may be mixed equally. Or the frequencies of $\omega_o:\omega_o+\omega_c:\omega_o+2\omega_c:\omega_o+3\omega_c$ may be mixed at a ratio of 3:2:1:4 to produce frequency diversity effects.

In the second method in which relative phase signals $f_1$ to $f_4$ are used as parameter, it is judged from the relative phase signals $f_1$ to $f_4$ whether the signals have been affected by any noise or distortion. This procedure is that the threshold values of the relative phase are set within a range of the relative phase in advance, and it is judged whether the relative phase signals $f_1$ to $f_4$ are within the threshold value, that is, within the shaded area in FIG. 4. If, for example, sending signals are distorted on the transmission line 3, and the relative phase signals $f_1$ to $f_4$ of the respective carrier signals detected at the DFT processors 21 to 24 (indicated with black spots in FIG. 4) as shown in FIG. 4 indicate the phase shifts, it can be taken that the carrier signals outputting the relative phase signals $f_1$ to $f_4$ not exceeding the preset phase range between the threshold values $\gamma_1$ and $\gamma_2$ are quite free from the effect of line distortion. In FIG. 4, therefore, the selection control means 40 eliminates the carrier signal $\omega_o+2\omega_c$ which is outside the threshold value range between $\gamma_1$ and $\gamma_2$ and selects out the other carrier signals $\omega_o$, $\omega_o+\omega_c$ and $\omega_o+3\omega_c$. Those three carrier signals are then mixed and outputted as detected data by the receiving signal synthesizing means 30.

When these relative phase signals $f_1$ to $f_4$ are used as parameter, too, the mixing ratio of the carrier signals may be varied as in the method using the absolute value signals $a_1$ to $a_4$ as parameter.

The third method which uses both the absolute value signals $a_1$ to $a_4$ and the relative phase signals $f_1$ to $f_4$ as parameter is to find from those two types of signals if a carrier signal is affected by some noise or distortion. That is to say, this method sets both two threshold values α and β of the intensity of the absolute value signals $a_1$ to $a_4$ and two threshold values $\gamma_1$ and $\gamma_2$ or the relative phase range in advance as described above. It is then judged whether the intensity level of absolute values $a_1$ to $a_4$ and the relative phase signals $f_1$ to $f_4$ are both within the set threshold value range or the shaded area in FIG. 5. And the carrier signals which meet the conditions are picked out for synthesis.

In FIG. 5, therefore, the selection control means 40 eliminates the carrier signal with a frequency of $\omega_o+3\omega_c$, (marked with a black spot in FIG. 5) as off the intensity threshold value range (which is indicated in the distance from the center or intersection point of the threshold values $\gamma_1$ and $\gamma_2$) and the carrier signal with a frequency of $\omega_o+2\omega_c$ as off the threshold value range of the relative phase signals $f_1$ to $f_4$, but picks out the carrier signals with frequencies of $\omega_o$ and $\omega_o+\omega_c$. And those two carrier signals are mixed and outputted as detected data by the receiving signal synthesizing means 30.

As set forth above, the communication system in the first embodiment of the present invention eliminates the receiving signals in a band where the signal power is attenuated with a poor signal to noise ratio (SNR) because of the line distortion or reduces the mixing ratio of those signals in the synthesizing process, thereby improving the overall SNR. Also the mixing into data of a plurality of carrier signals from the selection control means can create frequency diversity effects and reduce the influence of narrow band noise.

In the communication system of the first embodiment of the present invention the DFT processor 21 to 24 detect the absolute value signals $a_1$ to $a_4$ and angles of carrier signals. The detection can be effected by narrow band pass filter (BPF) instead of the DFT processors 21 to 24. The first embodiment of the present invention is described using PSK-modulated data. The present embodiment is not limited to that, but can be practiced with amplitude shift keying (ASK) modulated or DPSK modulated data just the same.

Furthermore, it is possible to build a multiplex transmission for a plurality of input data by providing the sender 1 in the system of this first embodiment with a plurality of multipliers 11's and carrier signal generators 12's and a means for synthesizing all the outputs from the plurality of multipliers 11's.

EMBODIMENT 2

Figure 6:
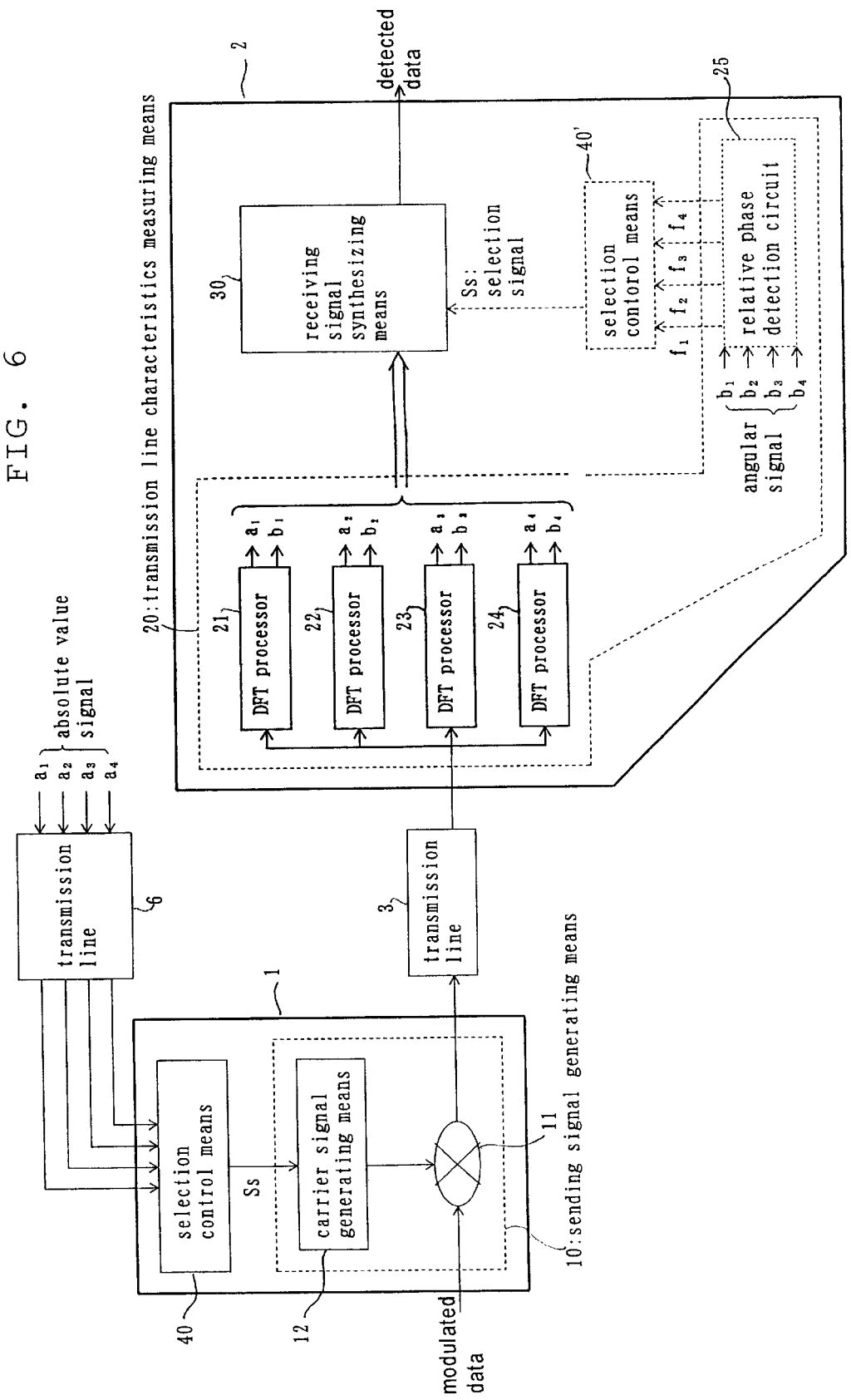
FIG. 6 is a block diagram showing the configuration of a communication system in a second embodiment of the present invention.

FIG. 6 is a block diagram showing the configuration of a communication system as a second embodiment of the present invention.

The selection control means 40 as shown in FIG. 1 can be provided in the sender 1. As illustrated in FIG. 6, the present embodiment is so constituted that the respective outputs from the DFT processors 21 to 24 are fed back to the selection control means 40 provided in the sender 1 via the transmission line 3.

The selection signal Ss of the selection control means 40 sets the carrier signals to be generated at the carrier signal generator 12. Merely selecting the carrier signals to be sent using the absolute value signal $a_1$ to $a_4$ on the sender side eliminates the need to do selection again in the receiver if the selected carrier signals are sufficiently high in reliability. In case no sufficient reliability can be secured however, it can be configured that the carrier signals are further put to selection using the relative phase signals $f_1$ to $f_4$ on the receiver side as indicated in dashed line in FIG. 6.

Other possible configurations than that in the present second embodiment are the same as those in the first embodiment. The same reference numbers are used in those configuration, but there will be no detailed description.

It is understood that the modulated data to be inputted into the multiplier 11 in the second embodiment are PSK-modulated ones as shown in FIG. 2(a). The carrier signal generator 12 outputs a plurality of carrier signals for impulse response in the transfer function $H(\omega)$ given in equation (2) in which the control action of the selection control means 40 is reflected $$H(\omega)=A_1\delta(\omega-\omega_o)+A_2\delta(\omega-\omega_o-\omega_c)+A_3\delta(\omega_o-\omega_o-2\omega_c)+A_4\delta(\omega-\omega_o-3\omega_c) \quad (2)$$

The parameters A1 to A4 in equation (2) are values based on the absolute value signals $a_1$ to $a_4$ for the respective carrier signals fed back from the receiver 2. Therefore, that means that the conditions on the transmission line are incorporated in the parameters A1 to A4.

The initial parameters to be given in this second embodiment are A1=A2=A3=A4=1. In this initial state, therefore, the impulse waveform in the transfer function $H(\omega)$ is the same as shown in FIG. 2(b) while the sending signals outputted from the multiplier 11 have the spectrum waveform as shown in FIG. 2(c).

In the following description of the second embodiment, emphasis is placed on the part of the processing which is different from that in the first embodiment.

As in the first embodiment, the respective DFT processors 21 to 24 on the receiver side detect the absolute value signals $a_1$ to $a_4$ and angular signals $b_1$ to $b_4$ in the corresponding carrier signals, and feed back those absolute value signals $a_1$ to $a_4$ to the selection control means 40 on the sender side via the transmission line 3 and at the same time inputs the angular signals $b_1$ to $b_4$ in the relative phase detection circuit 25.

Receiving the absolute value signals $a_1$ to $a_4$ in the respective carrier signals, the selection control means 40 determines the intensity of those signals and generates parameters A1 to A4 on the basis of that intensity.

Figure 7A:
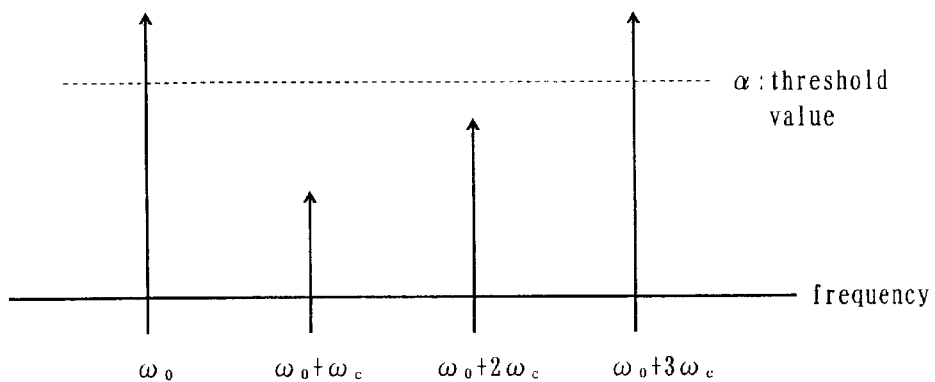
FIG. 7 shows a typical selection of carrier signals with both absolute value signals and relative phase signals which takes place in the selection synthesizing circuit in FIG. 6.
Figure 7B:
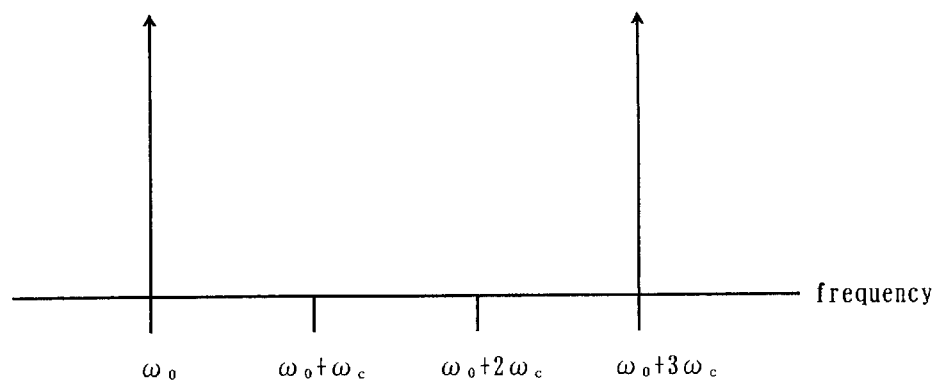
Figure 7C:
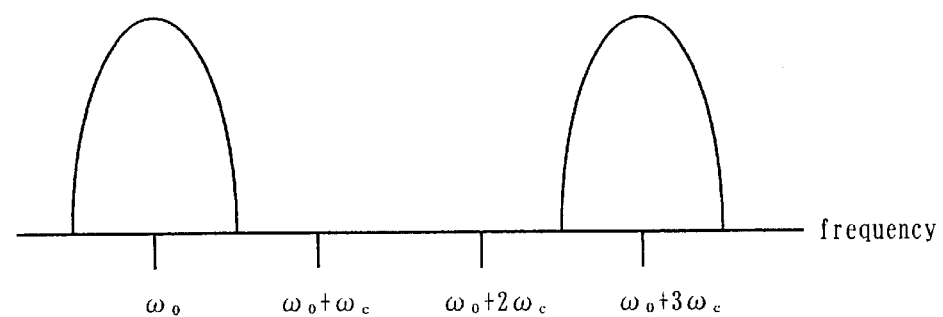

To be concrete, in case the absolute value signals $a_1$ to $a_4$ in the corresponding carrier signals fed back from the receiver 2 are each attenuated in intensity because of such factors as line distortion the selection control means 40 so controls the carrier signal generator 12 as to bring to "0" the parameters A2 and A3 for the carrier signals with frequencies of $\omega_o+\omega_c$ and $\omega_o+2\omega_c$ under the threshold a and to turn to "1" the parameters A1 and A4 for the carrier signals with frequencies of $\omega_o$ and $\omega_o+3\omega_c$. Through that control action, the impulse response of the transfer function $H(\omega)$ from the carrier signal generator 12 is made as shown in FIG. 7(b). After that control action therefore, the signals sent out from the multiplier 11 will take a spectrum waveform as shown in FIG. 7(c). That permits transmission of data avoiding the carrier signals having line distortion.

As set forth above, the second embodiment of the present invention feeds back the absolute value signals with the line characteristics incorporated in them to the sender 1 from the receiver 2. Using those absolute value signals $a_1$ to $a_4$, the sender 1 is so controlled as not to send data in a band where the signal power is attenuated with SNR deteriorated because of line distortion. Thus the sending signals as a whole are improved in SNR.

The description has been made of the operation in which the lower threshold value α is used The description is applicable both where the upper threshold value β is used and where the two threshold values are used.

In the second embodiment of the present invention the absolute value signals $a_1$ to $a_4$ for the corresponding carrier signals are used to control the carrier signals by feeding back those absolute value signals to the selection control means 40. The same results can be obtained by using the relative phase signals $f_1$ to $f_4$ for the respective carrier signals instead. Also use of both the absolute value signals $a_1$ to $a_4$ and the relative phase signals $f_1$ to $f_4$, needless to say, produces the same results.

In the second embodiment, the parameters for the absolute value signals $a_1$ to $a_4$ under the threshold value are set to "0". The parameters may be fixed according to the absolute value signals $a_1$ to $a_4$, for example, A1=1.2, A2=0.5, A3=0.5, A4=1.2.

Furthermore, in case the selection control means 40, provided on the sender side, uses the absolute value signals $a_1$ to $a_4$, the selection control means 40' on the receiver side may use the relative phase signals $f_1$ to $f_4$ to subject the carrier signals to selection control.

EMBODIMENT 3

Figure 8:
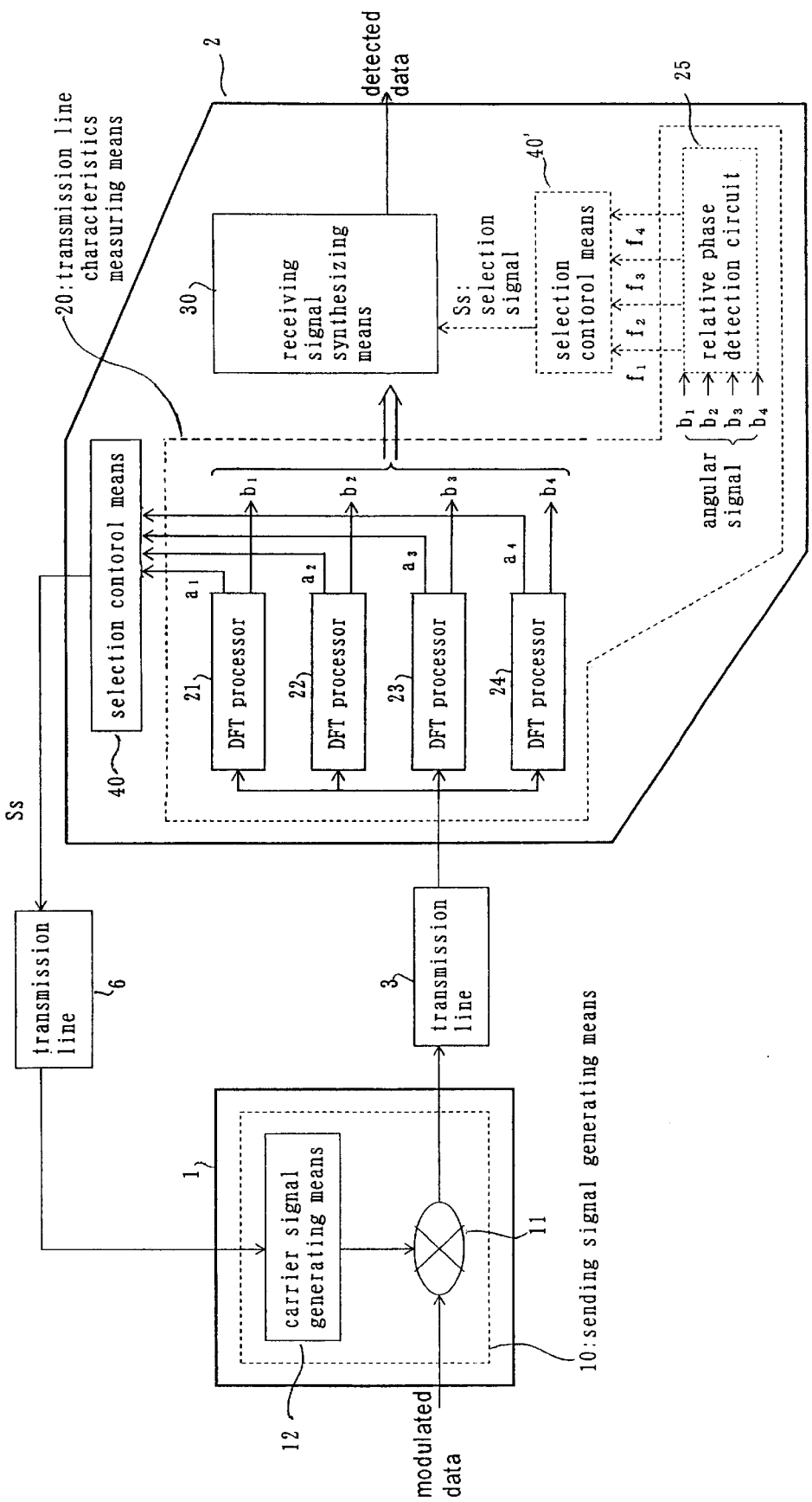
FIG. 8 is a block diagram showing the configuration of a communication system in a third embodiment of the present invention.

FIG. 8 is a block diagram showing the configuration of a communication system as a third embodiment of the present invention.

As a comparison between FIG. 6 and FIG. 8 shows, the third embodiment is different from the second embodiment in that the selection control means 40 is provided in the receiver 2 instead of the sender 1. Other than that, the two embodiments are identical in configuration and no explanation is made of the configuration of the third embodiment.

As mentioned above, the communication system of the third embodiment of the present invention has the selection control means 40 on the receiver side so as to feed back to the sender the signals or parameters to control the carrier signal generating means 12. Therefore, the third embodiment has the same features as the second embodiment of the present invention and makes it easy to build the feedback transmission line 3.

EMBODIMENT 4

Figure 9:
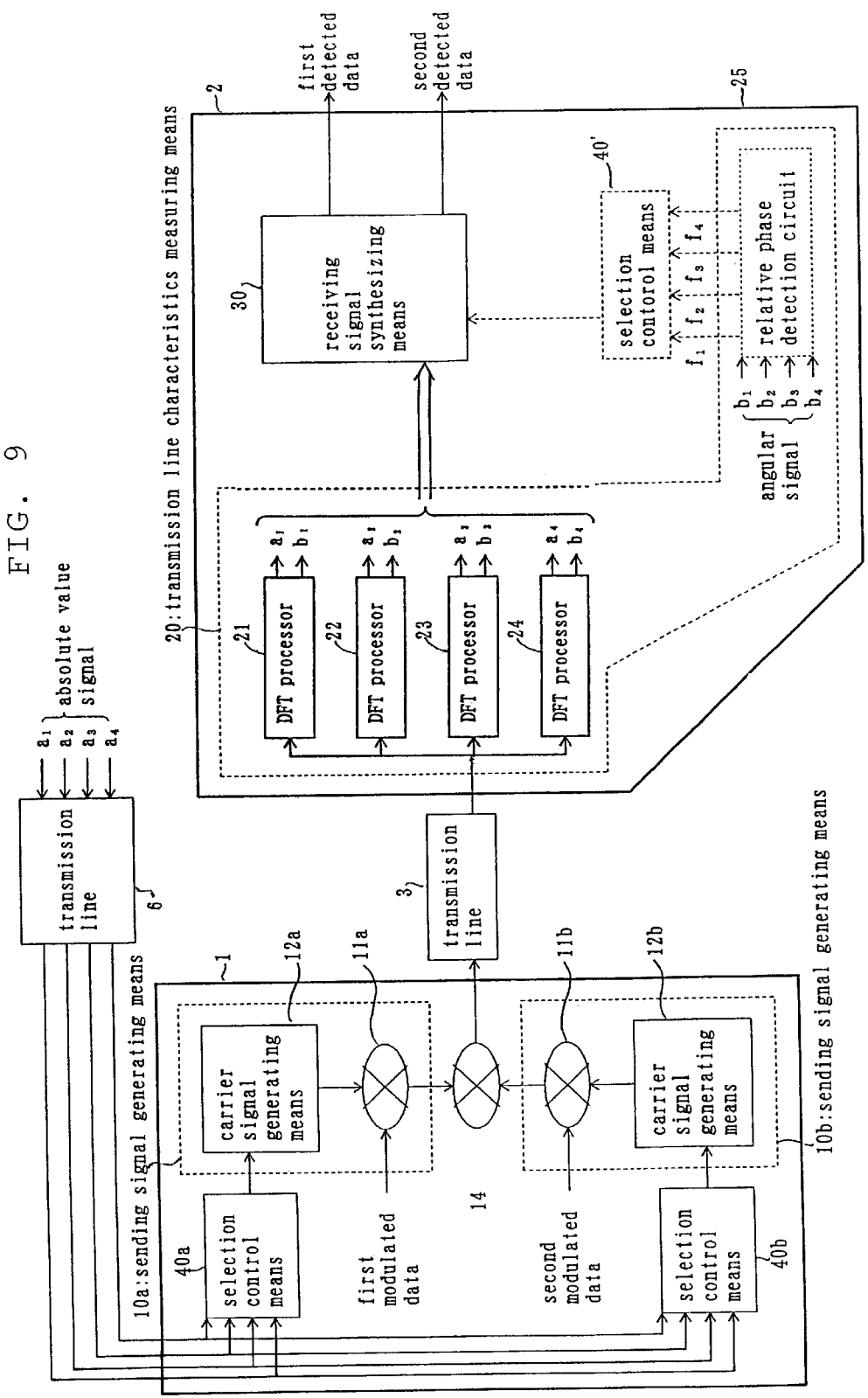
FIG. 9 is a block diagram showing the configuration of a communication system in a fourth embodiment of the present invention.

FIG. 9 is a block diagram showing the configuration of a communication system as a fourth embodiment of the present invention.

As shown in FIG. 9, the sender 1 and the receiver 2 are connected to each other via the transmission line 3 running from the sender 1 to the receiver 2 and via a transmission line 6 running from the receiver to the sender 1.

The sender 1 comprises two multipliers 11a and 11b two carrier signal generators 12a and 12h two selection control means 40a and 40b and a sending signal synthesizer 14. The receiver 2 is equipped with four DFT processors 21 to 24 a relative phase detection circuit 25 and a receiving signal synthesizing means 30.

As a comparison between FIG. 6 and FIG. 9 shows the fourth embodiment is different from the second embodiment in that the sender 1 in the present embodiment is provided with two sets of the sender of the second embodiment and a sending signal synthesizer 14. The receiver 2 of the fourth embodiment is basically the same as the receiver 2 in the second embodiment, but the receiving signal synthesizing means 30 of the fourth embodiment outputs as many detected data as the modulated data input in the receiver 2 (input data of the sender 1).

Other than that, the two embodiments are identical in configuration and common reference numbers are used and there is no detailed description of the configuration of the present embodiment.

The absolute value signals $a_1$ to $a_4$ for the respective carrier signals from the DFT processors 21 to 24 in the receiver 2 are input into the selection control means 40a and 40h. The selection control means 40a and 40b control the respective carrier signal generators 12a and 12b on the basis of those absolute value signals $a_1$ to $a_4$. According to those carrier signals, the carrier signal generators 12a and 12b generate and input carrier signals in the multipliers 11a and 11b.

The multiplier 11a multiplies the respective carrier signals inputted by the carrier signal generator 12a and the first modulated data together and outputs the results. The multiplier 11b multiplies the respective carrier signals inputted by the carrier signal generator 12b and the second modulated data together and outputs the results. Furthermore, the sending signal synthesizer 14 synthesizes the outputs from the multipliers 11a and 11b and outputs the results to the transmission line 3.

As set forth above, the fourth embodiment, which is equipped with two units of the receiver used in the second embodiment, has a plurality of carrier signals assigned for each of two different modulated signals (input signals) so that the respective carrier signals may be modulated with the two input data and sent out simultaneously. In the following description, a total of four carrier signals are assigned on the assumption that the present embodiment is configured on the same circuit scale as the first and second embodiments. To make the transmission quality as good as that of the other embodiments, however, it is desirable to allot four carrier signals for each of the two different modulated data.

It should also be noted that the modulated data to input are not limited to two. Still more inputs can be dealt with if there are provided as many multipliers, carrier signal generators and selection control means as the number of modulated data to input.

In the fourth embodiment, it is understood that the first modulated data to input in the multiplier 11a is a PSK modulated data shown in FIG. 10(a) and the second modulated data to input in the multiplier 11b is a PSK modulated data shown in FIG. 10(b). Also, the carrier signal generator 12a outputs a plurality of carrier signals for the impulse response of a transfer function Hb(ω) given in equation (3) in which the control action of the selection control means 40a is incorporated. The carrier signal generator 12b outputs a plurality of carrier signals for the impulse response of a transfer function Hb(ω) given in equation (4) in which the control action of the selection control means 40b is incorporated.

$$Ha(\omega)=A_1\delta(\omega-\omega_o)+A_2\delta(\omega-\omega_o-\omega_c)+A_3\delta(\omega-\omega_o-2\omega_c)+A_4\delta(\omega-\omega_o-3\omega_c) \quad (3)$$

$$Hb(\omega)=A_1\delta(\omega-\omega_o)+A_2\delta(\omega-\omega_o-\omega_c)+A_3\delta(\omega-\omega_o-2\omega_c)+A_4\delta(\omega-\omega_o-3\omega_c) \quad (4)$$

A1 to A4 and B1 to B4 in the equations are parameters obtained on the basis of the absolute value signals $a_1$ to $a_4$ fed back from the receiver 2. In the fourth embodiment, the parameters set in the carrier signal generator 12a are defined as A1=A2=1 and A3=A4=0. The parameters set in the carrier signal generator 12b are defined as B3=B4=1 and B1=B2=0.

Figure 10C:
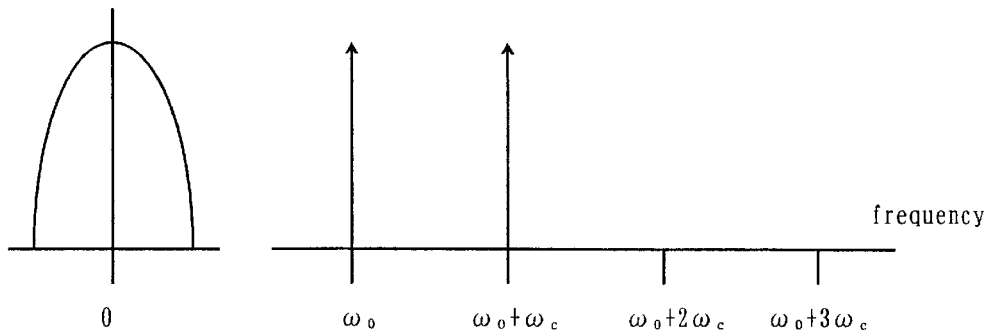
FIG. 10 shows examples of spectrum waveforms of the transfer functions and data of carrier signals in the receiver in FIG. 9.
Figure 10D:
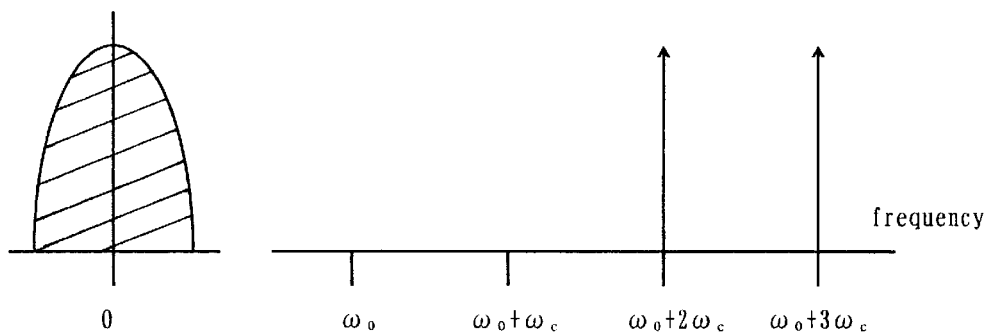
Figure 10E:
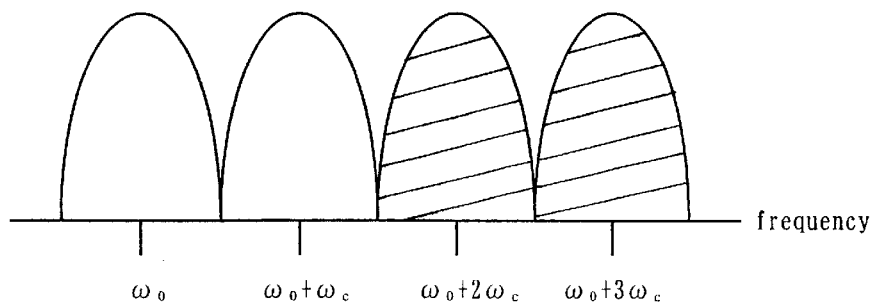

In this initial stage, therefore, the impulse waveforms (carrier signals) of transfer functions Ha(ω) and Hb(ω) are as shown in FIG. 10(c) and FIG. 10(d) respectively. The sending signals, the output of the sending signal synthesizer 14 takes a spectrum waveform as shown in FIG. 10(e).

Now, the operation of the fourth embodiment is explained in more detail with emphasis on where the present embodiment is different from the first and second embodiments.

The respective DFT processors 21 to 24 detects the absolute value signals $a_1$ to $a_4$ and angular signals $b_1$ to $b_4$ in the corresponding carrier signals as in the second embodiment. Those absolute value signals $a_1$ to $a_4$ are then fed back to the selection control means 40a and 40b via the transmission line 3 and at the same time outputs the angular signals $b_1$ to $b_4$ to the relative phase detection circuit 25.

Receiving feedback of the absolute value signals $a_1$ to $a_4$, the selection control means 40a judges the intensity of the first modulated data and controls the parameters A1 to A4 on the basis of the judgment results. The selection control means 40b to which the absolute value signals $a_1$ to $a_4$ judges the intensity of the second modulated data and controls the parameters B1 to B4 on the basis of the judgment results.

Figure 11A:
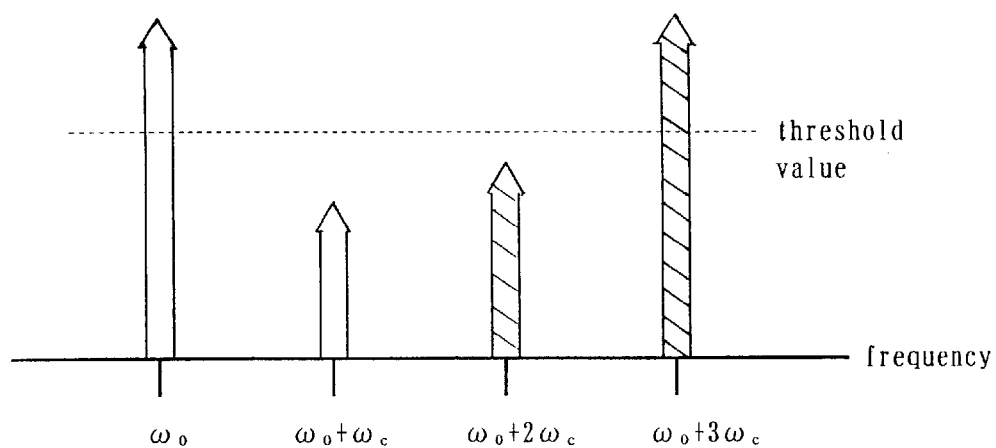
FIG. 11 shows a typical selection with absolute value signals of carrier signals which is carried out by a receiving signal synthesizing means in FIG. 11.
Figure 11B:
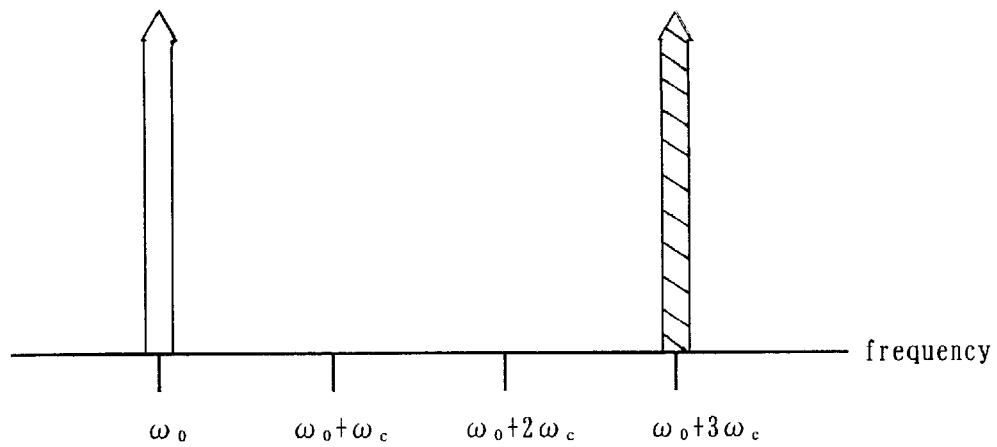
Figure 11C:
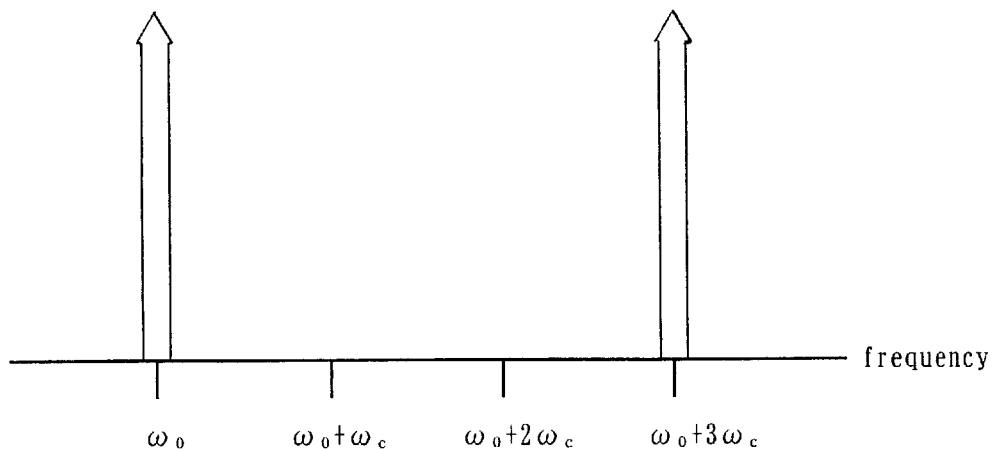

In principle, those selection control means 40a and 40b do the same selection of the absolute value signals $a_1$ to $a_4$ as the selection control means 40 in the first embodiment. For example, in case the absolute value signals $a_1$ to $a_4$ for the corresponding carrier signals are attenuated in intensity to varying degrees because of such factors as line distortion as shown in FIG. 11(a), the selection control 40a so controls the carrier signal generator 12a as to bring to "0" the parameter A2 for the carrier signals with frequencies of $\omega_o+\omega_c$ under the threshold value along with the parameters for A3 and A4. And the selection control 40*b* so controls the carrier signal generator 12*b* as to bring to "0" all the parameters B2, B3 and B4 for the carrier signals with frequencies of $\omega_o+2\omega_c$ below the threshold value. In FIG. 11, the signal intensity of the first modulated data is indicated by blank arrow while the signal intensity of the second modulated data is indicated by shaded arrow. Through that control action the signals to be send from the sending signal synthesizer 14 takes spectrum forms as shown in FIG. 11(*b*). Thus two information signals can be sent with the carrier signals affected by line distortion eliminated.

Furthermore, if the parameters A1 and A2 are set to "0" and the parameters B1 and B2 to "1" in the first carrier signal generator 12*a*, then the carrier signal $\omega_o+3\omega_c$ will be loaded with the first modulated data, and not the second one, as shown in FIG. 11(*c*). In this case only the first modulated data can be sent, but the frequency diversity effects reduce the influence on the first modulated data of narrow band noise.

As shown, the communication system in the fourth embodiment of the present invention permits transmission of high quality data with improved SNR when a plurality of independent data are sent, that is, multiplexed, or a plurality of data is transmitted divided in carrier signals at a high speed. That is effected through provision of the aforesaid arrangement for each data and feedback of line characteristics from the receiver 2 to the sender 1 so that if a band is found where the signal power is attenuated because of line distortion with deteriorated SNR the number of multiplex data signals or data rate may be reduced.

In the fourth embodiment as in second embodiment, the absolute value signals $a_1$ to $a_4$ are fed back from the selection control means 40*a* and 40*b* and used as signals to control the carrier signals. The relative phase signals may be used instead to achieve the same results.

Also it is configured in the fourth embodiment that the parameter for a carrier signal below a set threshold value is set to "0" so as not to use that signal. Instead, the parameters may be so controlled as to vary the mixing ratio of the respective carrier signals.

The description has been made of the operation in which the lower threshold value is used Needless to say, the description is applicable where the upper threshold value is used or where the two threshold values are used Also, the relative phase signals $f_1$ to $f_4$ to indicate the phases within a specific range may be used in combination of course.

Furthermore, still higher quality data transmission is possible through provision of the selection control means 40' on the receiver side to do additional selection side by side by utilizing the output of the relative phase detection circuit 25.

EMBODIMENT 5

Figure 12:
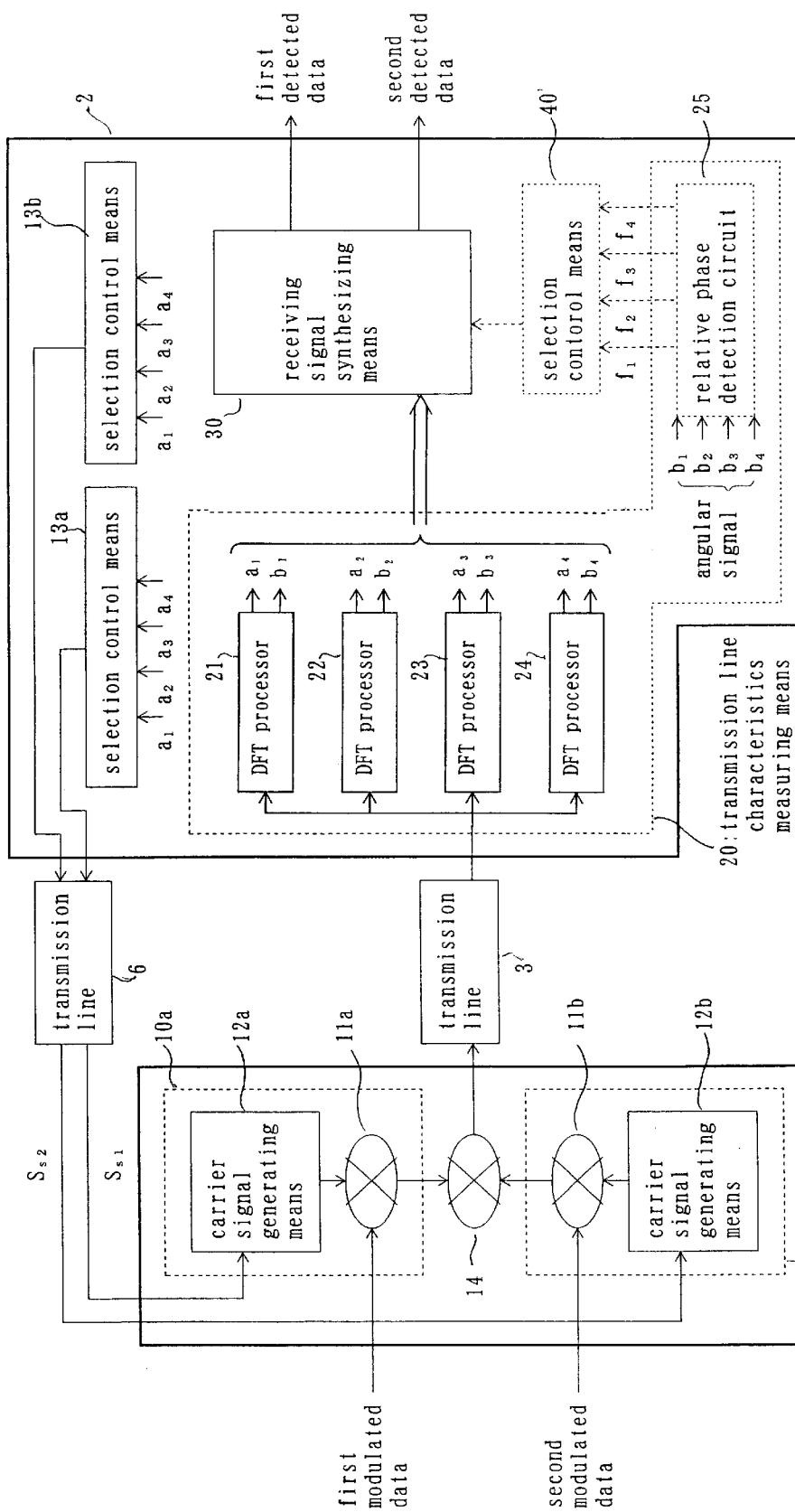
FIG. 12 is a block diagram showing the configuration of a communication system in a fifth embodiment of the present invention.

FIG. 12 is a block diagram showing the configuration of a communication system as a fifth embodiment of the present invention.

As shown in FIG. 12, the fifth embodiment is different from the fourth embodiment in that the selection control means 13*a* and 13*b* are formed in the receiver 2 instead of the sender 1. Other than that, the two embodiments are identical, and no description will be made of the configuration of the fifth embodiment.

As mentioned the selection control means 40*a* and 40*b* are incorporated in the receiver so as to feed back to the sender 1 the parameter signals to control the carrier signal generators 12*a* and 12*b*. That simplifies the formation of the feedback transmission line 6 in addition to bring about the same features as presented in the fourth embodiment.

EMBODIMENT 6

In the foregoing embodiments, the input signals and carrier signals are multiplied together. It is possible to pick out the carrier signal directly from the input signals using filters. In this sixth embodiment, still better results can be achieved by merely passing the input signals through a plurality of filters having central frequencies on the axis of frequency at a specific interval so as to extract carrier signals free from interfering with each other on the axis of frequency hereinafter called orthogonal signal) and free from interfering between one frequency and the preceding or following frequency on the axis of time (in this case, too called orthogonal signal).

Figure 13:
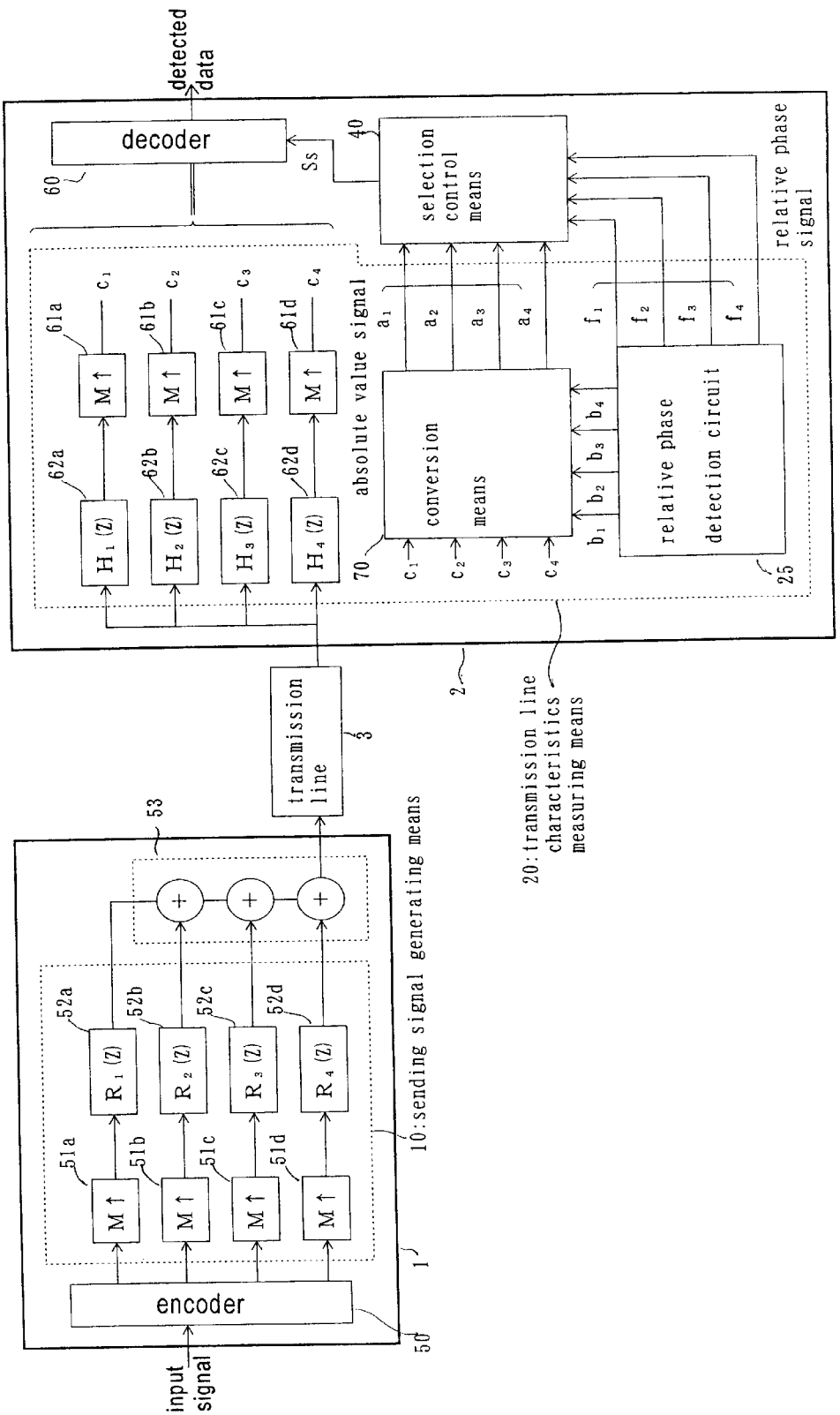
FIG. 13 is a block diagram showing the configuration of a communication system in a sixth embodiment of the present invention.
Figure 14:
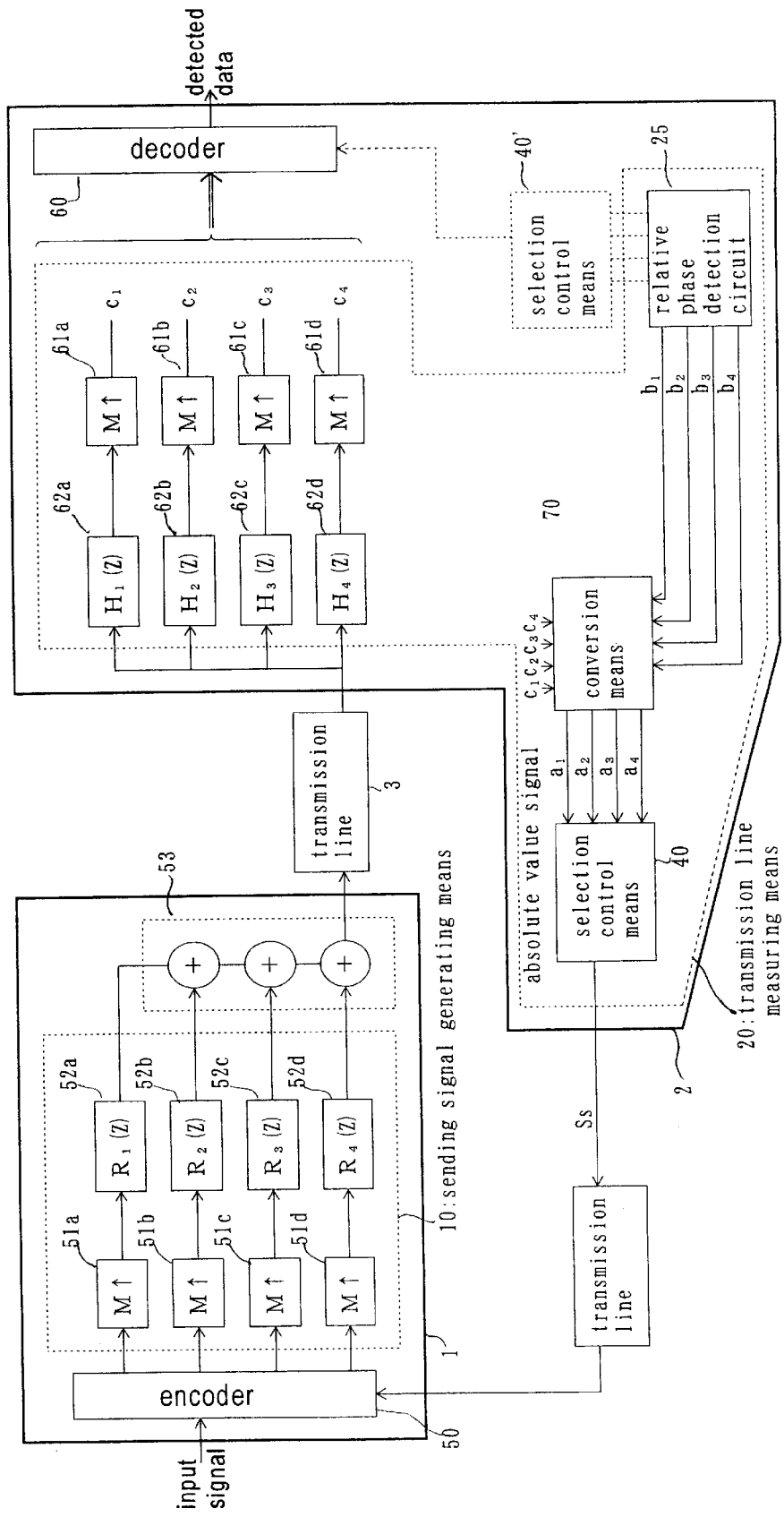
FIG. 14 is a block diagram showing another configuration of a communication system in a sixth embodiment of the present invention.
Figure 15:
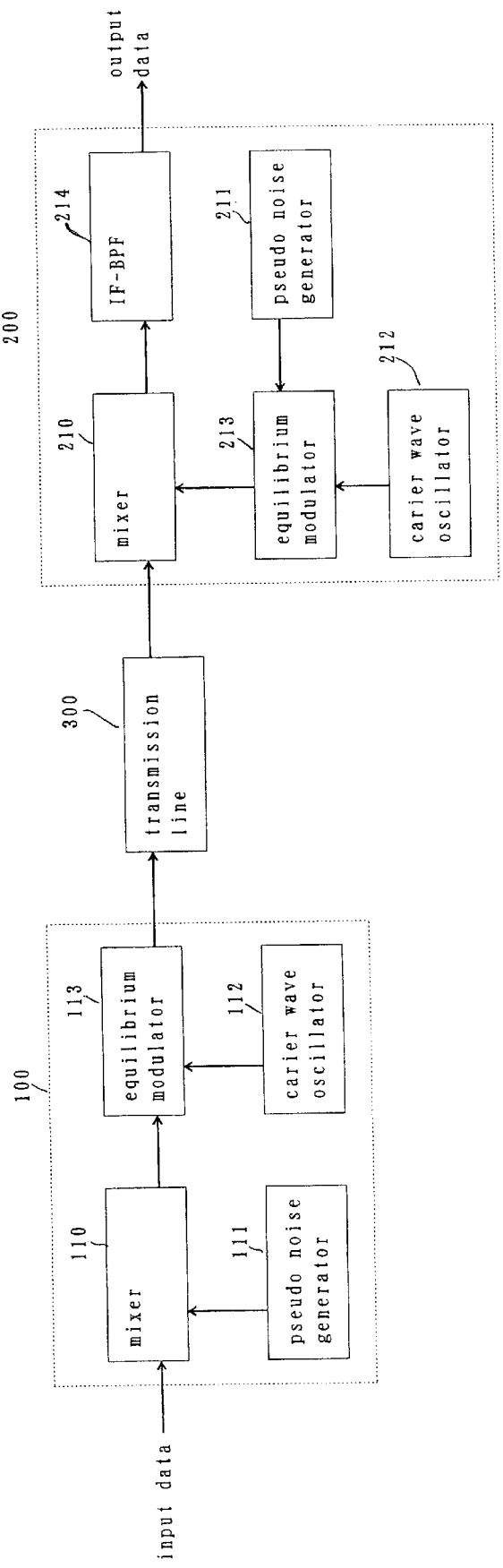
FIG. 15 is a block diagram showing a typical configuration of the prior art communication system.

FIGS. 13 and 14 show basic configurations of communication systems using double orthogonal carrier signals which are orthogonal both on the axis of frequency and the axis of time. The input signals are input in an encoder 50 in the sender 1 and divided in the number corresponding to that of filters 52*a* to 52*d* in the next step. For purpose of simplification and better understanding the input signals shall be digital and named "1". But it goes without saying that modulated signals may be used as in the preceding embodiments 1 to 5.

The signals thus generated are upsampled by upsampling means 51*a* to 51*d* into a plurality of signals within the same bit rate, to be concrete, a plurality (M–1) of "0"'s are inserted behind the input "1". The number of "0" to be inserted is not limited If three "0"'s (that is, M–4) are inserted, the time of "1" in one bit rate is shortened to ¼. The time of "1" in one bit decreases with increasing number of "0"'s inserted As will be described the larger the number of "0"'s, the less the effect of noise.

The upsampling is to shorten the diffusion interval of input signals on the time axis. That is effective, on the frequency axis, in scattering the input signals in a narrow band over a wide range from a low frequency band to a high frequency band and is equivalent to the step of converting the input signals into high frequency carrier signals as in the multiplication in the other foregoing embodiments.

The input signals thus upsampled are inputted in a plurality (in this case 4) of filters 52*a* to 52*d* of which the central frequencies assume values at a specific interval. Here, the impulse response to the respective samples on the filters in the sender can be given as follows:

$$f_i(n), \{i=1, 2, \ldots M\} \quad (10)$$

and if the filter design conditions are as follows.

$$\sum_{n=0}^{j-1} f_{i1}(n), \quad f_{i2}(n-jM) = A\delta(j)\delta(i_1-i_2) \quad (11)$$

where

L: number of taps of filters $i_1$, $i_2$: suffixes indicating carrier signals j: duplication coefficient M: number of samples per data bit A: integral number >0

δ: delta function then filters can be obtained which satisfy the orthogonal requirements both on the time axis and the frequency axis. The equation (11) will have a value when j=0, that is, when there is no sample duplication or $i_1=i_2$, that is, when a carrier signal is not duplicated by another frequency carrier signal. In any other case, the equation will be "0", with the formation of a carrier signal infinitesimal both on time axis and frequency axis.

The outputs from the filters 52a to 52d thus designed are synthesized by the synthesizing means 53 and sent out on the transmission line. Thus, the sending signals are turned into carrier signals with frequencies at certain intervals.

The sending signals thus sent out are inputted into filters 62a to 62d provided in the receiver 2 which are equal in number to the filters 52a to 52d in the sender 1 that also correspond to those filters in central frequency. Here, the impulse response to samples on the filters in the receiver 2 can be expressed as follows:

$$h_{1i}(n), \{i=1, 2, \ldots M\} \tag{21}$$

and the filters are designed to conform to the following conditions:

$$h_1(z) = z^{-(1-1)} F_1(z^{-1}) \tag{22}$$

In other words, the filters are so designed that the outputs from filters 62a to 62d are identical with the inputs of the filters 52a to 52d but are delayed on the axis of time, and then the filters 62a to 62d meet the following orthogonal requirements:

$$\sum_{n=0}^{j-1} h_{i1}(n), \quad h_{i2}(n - jM) = A \delta(j) \delta(i_1 - i_2) \tag{22}$$

Thus, any noise that arises will not affect the output as long as it is not identical with the filters 62a to 62d in central frequency and on the axis of time (in the above case, the first ¼ of one bit rate).

The outputs of the filters 62a to 62d in the receiver 2 are inputted in the don-sampling means 61a to 61d. Data is eliminated which corresponds to the samples added by the u[]:sampling means 51a to 51d at the time of sending and then the signals required for synthesis are inputted in a decoder 60, a receiving signal synthesizing means. The required signals are angular signals, absolute value signals or the very real signals outputted by the down-sampling means 61a to 61d.

Meanwhile, the outputs of the down-sampling means 61a to 61d are led to a conversion means 70 which detects the absolute value signals $a_1$ to $a_4$ and angular signals $b_1$ to $b_4$. There, the absolute value and angle of each frequency component in the sending signals are detected as the DFT processors 21 to 24 do in the previous embodiments 1 to 5. Those angular signals $b_1$ to $b_4$ are further inputted in the relative phase detection means 25 to detect the relative phase. Here, both or either of the absolute value signals $a_1$ to $a_4$ and relative phase signals $f_1$ to $f_4$ thus detected are inputted in the selection control means 40 provided in the sender 1 or the receiver 2 and are used to control the sending signals or receiving signals the same way as described in the previous embodiments 1 to 5.

In the example shown in FIG. 13 the absolute value signals $a_1$ to $a_4$ and the relative phase signals $f_1$ to $f_4$ are both used and involved in selection at the signal section means 40 or decision on the mixing ratio. The decoder does decoding on the basis of those results.

The example illustrated in FIG. 14 feeds back the absolute value signals $a_1$ to $a_4$ from the conversion means 70 to the encoder 50 in the sender 1, which then selects carrier signals or decides on the mixing ratio of the carrier signals. In this case, too it goes without saying that it is possible to use the relative phase signals $f_1$ to $f_4$ from the relative phase detection means 25 on the receiver side as well and further put those signals to selection control.

What is claimed is:

1. A sender for use in a communication system in which a sender and a receiver are connected to each other via a transmission line, said sender comprising:
   a sending signal generating means for generating a plurality of carrier signals conveying same signal contents based on an input signal, wherein the plurality of carrier signals are non-interfering with each other; and
   a selection control means for controlling respective signal intensity of said plurality of carrier signals according to transmission characteristics of said plurality of carrier signals detected on the receiver side.

2. A sender as defined in claim 1, wherein said sending signal means includes:
   a carrier signal generating means for generating a plurality of carriers; and
   a multiplying means for multiplying said carriers to generate said carrier signals by the input signal and sending said carrier signals on a transmission line.

3. A sender as defined in claim 2, wherein said sending signal generating means are provided with said input signal that modulates said plurality of carriers, and the sender further comprises a sending signal synthesizing means for synthesizing the outputs from said sending signal generating means.

4. A sender as defined in claim 2, wherein said selection control means selects one of said carriers to be put to said carrier signal generating means.

5. A sender as defined in claim 2, wherein said selection control means provides a uniform distribution mixing ratio among all the carriers to be put to said carrier signal generating means.

6. A sender as defined in claim 2, wherein said selection control means provides a weighted distribution mixing ratio among all the carriers to be put to said carrier signal generating means on the basis of the transmission line characteristics of the respective carrier signals received by the receiver.

7. A sender for use in a communications system in which the sender and a receiver are connected to each other via a transmission line, said sender comprising:
   a sending signal generating means for generating a plurality of carrier signals conveying same signal contents based on an input signal, wherein the plurality of carrier signals are non-interfering with each other both on the axis of frequency and the axis of time; and
   a selection control means for controlling respective signal intensity of said plurality of carrier signals according to transmission characteristics of said plurality of carrier signals detected on the receiver side.

8. A sender for use in a communications system in which the sender and a receiver are connected to each other via a transmission line, said sender comprising:
   an encoder for generating a plurality of carrier signals conveying same signal contents based on an input signal;
   a plurality of filters, with said plurality of carrier signals as input, for outputting a plurality of signals, said plurality of signals free from interfering with each other both on the axis of frequency and the axis of time; and
   a sending signal synthesizing means for synthesizing the outputs of said filters based on transmission characteristics of said plurality of signals detected on the receiver side.

9. The sender of claim 10, further comprising selection control means for controlling the intensity distribution of the plurality of signals according to transmission characteristics of respective signals detected on the receiver side.

10. A receiver for use in a communication system in which a sender and a receiver are connected to each other via a transmission line, said receiver comprising:

transmission line characteristics measuring means for receiving a plurality of carrier signals conveying same signal contents based on an input signal and for determining transmission line characteristics in respective frequency bands for said plurality of carrier signals;

receiving signal synthesizing means for synthesizing the outputs of said transmission line characteristics measuring means; and selection control means for controlling respective signal intensity of said plurality of carrier signals in synthesizing carrier signals based on the transmission characteristics of respective carrier signals.

11. The receiver as defined in claim 10, wherein said selection control means selects signals to be put to said receiving signal synthesizing means from said carrier signals.

12. The receiver as defined in claim 10, wherein said selection control means provides a uniform distribution mixing ratio among all the carrier signals to be put to said receiving signal synthesizing means.

13. The receiver as defined in claim 10, wherein said selection control means provides a weighted distribution mixing ratio among all the carrier signals to be put to said receiving signal synthesizing means on the basis of the transmission line characteristics of the corresponding carrier signals.

14. The receiver as defined in claim 10, wherein the transmission line characteristics measuring means determines the signal intensity of said carrier signals received.

15. A receiver as defined in claim 14, wherein said selection control means has a lower threshold value and/or upper threshold value stored therein and selects the carrier signals having signal intensity over said lower threshold value and/or said upper threshold value.

16. A receiver as defined in claim 14, wherein said relative phase is detected by a relative phase detection circuit detecting the difference between the angular signals obtained from said respective filters and the reference phase.

17. The receiver as defined in claim 10, wherein the transmission line characteristics measuring means determines the relative phase of said plurality of carrier signals received in relation to a reference phase.

18. A receiver as defined in claim 17, wherein said selection control means has threshold values defining a phase range stored therein and selects the carrier signals having relative phase value within said threshold value range.

19. The receiver as defined in claim 10, wherein the transmission line characteristics measuring means determines both the signal intensity of said carrier signals received and the relative phase of said carrier signals received in relation to a reference phase.

20. A receiver as defined in claim 19, wherein said selection control means has a lower threshold value and/or upper threshold value stored therein and selects the carrier signals having signal intensity over said lower threshold value and/or said upper threshold value.

21. A receiver as defined in claim 14, herein said signal intensity is detected by a plurality of filters for the frequency bands of the carrier signals.

22. A receiver as defined in claim 21, wherein said plurality of filters are provided for said carrier signals so formed on the sender side not to interfere with each other both on the axis of frequency and the axis of time, the central frequencies of said plurality of filters being frequencies of said carrier signals and said filters letting through said carrier signals which will not interfere with each other both on the axis of frequency and the axis of time.

23. A communication system in which a sender and a receiver are connected to each other, wherein the sender has:

a carrier signal generating means for generating a plurality of carrier signals with different frequencies based on an input signal; and, a multiplication means for sending out on a transmission line said plurality of carrier signals modulated by said input signal, wherein the carrier signals, after modulated by said input signal, convey same signal contents; and, wherein the receiver is provided with:

a transmission line characteristics measuring means for receiving the plurality of carrier signals modulated by said input signal from the sender and for determining transmission line characteristics in respective frequency bands of said plurality of carrier signals; and a receiving signal synthesizing means for synthesizing said plurality of carrier signals on the basis of the transmission line characteristics;

wherein, at least one of the sender and the receiver includes a selection control means for controlling respective signal intensity of the plurality of carrier signals based on the transmission characteristics of the respective carrier signals.

24. A communication system as defined in claim 23, further comprising a selection control means for controlling said receiving signal synthesizing means with regard to the respective signal intensity at the time of transmission among said plurality of carrier signals on the basis of the transmission characteristics on said transmission line of the respective carrier signals.

25. A communication system as defined in any of claims 24, wherein said selection control means selects carrier signals to synthesize on the basis of the transmission line characteristics.

26. A communication system as defined in any of claim 24, wherein said selection control means provides a uniform distribution mixing ratio among said plurality of carrier signals.

27. A communication system as defined in any of claims 24, wherein said selection control means provides weighted distribution in the mixing ratio among said plurality of carrier signals on the basis of the transmission line characteristics of the respective carrier signals.

28. A communication system as defined in claim 23, wherein said sender includes a sending signal generating means comprising a carrier signal generating means and a multiplication means for each of said plurality of carrier signals, and furthermore with a sending signal synthesizing means for synthesizing the outputs from the respective multiplication means.

29. A communication system as defined in claim 28, wherein said sender or the receiver is further provided with a plurality of selection control means for controlling said plurality of carrier signal generating means with regard to the mixing ratio at the time of transmission of said plurality of carrier signals on the basis of the measurement results of the transmission characteristics on said transmission line of the respective carrier signals by said transmission line characteristics measuring means in said receiver.

30. A communication system as defined in claim 29, wherein said transmission line characteristics measuring means determines the signal intensities in said carrier signals received by the receiver.

31. A communication system as defined in claim 30, wherein said selection control means has a lower threshold value and/or upper threshold value stored therein and selects the carrier signals having signal intensity over said lower threshold value and/or said upper threshold value.

32. A communication system as defined in claim 30, wherein said signal intensity is detected by a plurality of filters for the frequency bands of the respective carrier signals.

33. A communication system as defined in claim 32, wherein said plurality of filters are provided for the carrier signals so formed on the sender side as to satisfy orthogonal requirements other both on the axis of frequency and the axis of time, the central frequencies of said plurality of filters being frequencies of said carrier signals and said filters satisfying orthogonal requirements both on the axis of frequency and the axis of time.

34. A communication system as defined in claim 30, wherein said relative phase is detected by a relative phase detection circuit detecting the difference between the angular signals obtained from said filters and a reference phase.

35. A communication system as defined in claim 29, wherein said transmission line characteristics measuring means determines the relative phase in said carrier signals received by the receiver in relation to a reference phase.

36. A communication system as defined in claim 35, wherein said selection control means has threshold values defining a phase range stored therein and selects the carrier signals having relative phase within said threshold value range.

37. A communication system as defined in claim 29, wherein said transmission line characteristics measuring means determines both the signal intensities and the relative phase in said carrier signals received by the receiver in relation to a reference phase.

38. A communication system as defined in claim 37, wherein said selection control means has a lower threshold value and/or upper threshold value stored therein and selects the carrier signals having signal intensity over said lower threshold value and/or said upper threshold value.

39. A communication system as defined in claim 37, wherein said selection control means has threshold values defining a phase range stored therein and selects the carrier signals having relative phase within said threshold value range.

40. A communication system in which a sender and a receiver are connected to each other, wherein the sender has:
an encoder for generating a plurality of carrier signals conveying same signal contents based on an input signal,
a plurality of filters for, with said plurality of carrier signals as input, outputting a plurality of signals, said plurality of signals satisfying the orthogonal requirements both on the axis of frequency and the axis of time; and
a sending signal synthesizing means for synthesizing the outputs of said filters and generating a plurality of output signals,
and wherein the receiver comprises:
a transmission line characteristics measuring means for receiving said plurality of output signals and determining respective transmission line characteristics of said plurality of output signals; and
a receiving signal synthesizing means for synthesizing said plurality of output signals on the basis of a measurement results by said transmission line characteristics measuring means.

41. A communication system as defined in claim 40, wherein there is further provided in either the sender or the receiver a selection control means for controlling said encoder with regard to the respective signal intensity at the time of transmission among said plurality of carrier signals on the basis of the transmission characteristics on said transmission line of the respective carrier signals determined by said transmission line characteristics measuring means in said receiver.

42. A communication system as defined in claim 40, wherein said encoder in said sender selects a carrier to allot for each of said plurality of carrier signals.

\* \* \* \* \*

UNITED STATES PATENT AND TRADEMARK OFFICE
CERTIFICATE OF CORRECTION

PATENT NO. : 6,507,622 B2 Page 1 of 1
DATED : January 14, 2003
INVENTOR(S) : Masahiro Maki et al.

It is certified that error appears in the above-identified patent and that said Letters Patent is hereby corrected as shown below:

<u>Title page,</u>
Item [*] Notice, before "Subject to any disclaimer,…", insert the following paragraph:
-- This patent issued on a continued prosecution application filed under 37 CFR 1.53(d), and is subject to the twenty year patent term provisions of 35 U.S.C. 154(a)(2). --

<u>Column 17,</u>
Lines 28, 34 and 55, change the first word "The" to -- A --.
Line 65, change "herein" to -- wherein --;

<u>Column 18,</u>
Lines 41-42, change "any of claims 24" to -- claim 24 --;
Line 45, delete "any of";
Lines 49-50, change "any of claims 24" to -- claim 24 --.

Signed and Sealed this

Eighteenth Day of May, 2004

JON W. DUDAS
*Acting Director of the United States Patent and Trademark Office*